(12) United States Patent
Weclawski et al.

(10) Patent No.: US 8,534,727 B2
(45) Date of Patent: Sep. 17, 2013

(54) DEVICE WITH MULTIPLE ENGAGEMENT MEMBERS

(75) Inventors: Andre Weclawski, Mississauga (CA); Constantin Mighiu, Thornhill (CA); Berger Pogrzeba, Georgetown (CA); Peter Guttinger, Milton (CA)

(73) Assignee: Langen Packaging Inc., Mississauga, ON (CA)

( * ) Notice: Subject to any disclaimer, the term of this patent is extended or adjusted under 35 U.S.C. 154(b) by 677 days.

(21) Appl. No.: 12/285,616

(22) Filed: Oct. 9, 2008

(65) Prior Publication Data

US 2009/0257858 A1 Oct. 15, 2009

Related U.S. Application Data

(60) Provisional application No. 60/960,696, filed on Oct. 10, 2007.

(51) Int. Cl.
*B25J 15/06* (2006.01)
*B65G 47/26* (2006.01)

(52) U.S. Cl.
USPC ...... 294/65; 294/87.1; 414/749.5; 414/752.1; 198/468.3

(58) Field of Classification Search
USPC .................. 294/65, 87.1, 87.12; 414/416.02, 414/749.5, 752.1; 198/468.3, 468.4
See application file for complete search history.

(56) References Cited

U.S. PATENT DOCUMENTS

| | | | |
|---|---|---|---|
| 2,366,238 A | 1/1945 | Clausen | |
| 3,934,920 A | 1/1976 | Rowekamp | |
| 3,973,795 A * | 8/1976 | Goransson | 294/65 |
| 4,199,050 A | 4/1980 | Moller | |
| 4,370,092 A | 1/1983 | Healy | |
| 4,444,423 A | 4/1984 | Montferme et al. | |
| 4,444,424 A | 4/1984 | Lebret | |
| 4,810,154 A | 3/1989 | Klemmer et al. | |
| 4,832,180 A | 5/1989 | Ferrero | |
| 4,976,582 A | 12/1990 | Clavel | |
| 4,987,676 A | 1/1991 | Amorosi | |

(Continued)

FOREIGN PATENT DOCUMENTS

| | | |
|---|---|---|
| CA | 2 426 057 A1 | 10/2003 |
| DE | 19831181 C1 | 3/2000 |
| EP | 1 612 005 A1 | 1/2006 |

OTHER PUBLICATIONS

European Patent Office Communication Pursuant to Article 94(3) EPC Issued Oct. 23, 2009 for European Patent Application No. 08253297.9.

*Primary Examiner* — Dean Kramer

(74) *Attorney, Agent, or Firm* — Smart & Biggar

(57) ABSTRACT

An apparatus is disclosed for engaging and releasing a plurality of items. The apparatus comprises a frame having a longitudinally extending support member and at least one group of engagement unit. Each engagement unit has at least one engagement member, and each engagement unit is adapted for engaging, and disengaging from at least one item. Each of the engagement units in the one group is mounted in series for longitudinal movement on the longitudinal support member, and each one of the plurality of engagement units is interconnected to at least one other of the plurality of engagement units. A movement apparatus is provided for engaging at least one but not all of the plurality of engagement units in the one group to displace the group longitudinally on the longitudinal support member.

65 Claims, 26 Drawing Sheets

(56) References Cited

U.S. PATENT DOCUMENTS

| | | |
|---|---|---|
| 5,019,112 A | 5/1991 | Engelhardt et al. |
| 5,040,056 A | 8/1991 | Sager et al. |
| 5,060,455 A | 10/1991 | Schmeisser |
| 5,149,162 A | 9/1992 | Focke et al. |
| 5,263,378 A | 11/1993 | Loomer |
| 5,316,041 A | 5/1994 | Ramacier, Jr. et al. |
| 5,344,202 A | 9/1994 | Ramler et al. |
| 5,494,074 A | 2/1996 | Ramacier, Jr. et al. |
| 5,502,944 A | 4/1996 | Kraft et al. |
| 5,575,376 A | 11/1996 | Colamussi |
| 5,632,590 A | 5/1997 | Pearson et al. |
| 5,639,203 A | 6/1997 | Lee |
| 5,655,355 A | 8/1997 | Ramler |
| 5,664,322 A | 9/1997 | Best |
| 5,664,931 A | 9/1997 | Brugger et al. |
| 5,727,832 A | 3/1998 | Holter |
| 5,839,769 A | 11/1998 | Slocum et al. |
| 5,899,658 A | 5/1999 | Hofmeister |
| 5,931,279 A | 8/1999 | Pedrotto et al. |
| 5,984,623 A | 11/1999 | Smith et al. |
| 6,068,317 A | 5/2000 | Park |
| 6,201,203 B1 | 3/2001 | Tilles |
| 6,217,093 B1 * | 4/2001 | Neutel et al. ............... 294/87.1 |
| 6,220,424 B1 | 4/2001 | Fluck |
| 6,286,290 B1 | 9/2001 | Fluck |
| 6,309,001 B1 | 10/2001 | Sherwin et al. |
| 6,357,125 B1 | 3/2002 | Feldmann et al. |
| 6,357,994 B1 | 3/2002 | St. Onge |
| 6,374,996 B1 | 4/2002 | Hsieh |
| 6,439,631 B1 | 8/2002 | Kress |
| 7,134,833 B2 * | 11/2006 | de Koning ............... 414/753.1 |
| 7,390,040 B2 | 6/2008 | Subotincic |
| 7,464,807 B2 * | 12/2008 | Ham et al. ............... 198/468.3 |
| 7,690,706 B2 * | 4/2010 | Wild et al. ............... 294/65 |
| 7,954,869 B2 * | 6/2011 | Shim et al. ............... 294/65 |
| 2002/0053134 A1 | 5/2002 | Hidese |
| 2008/0003092 A1 | 1/2008 | Baclija et al. |

* cited by examiner

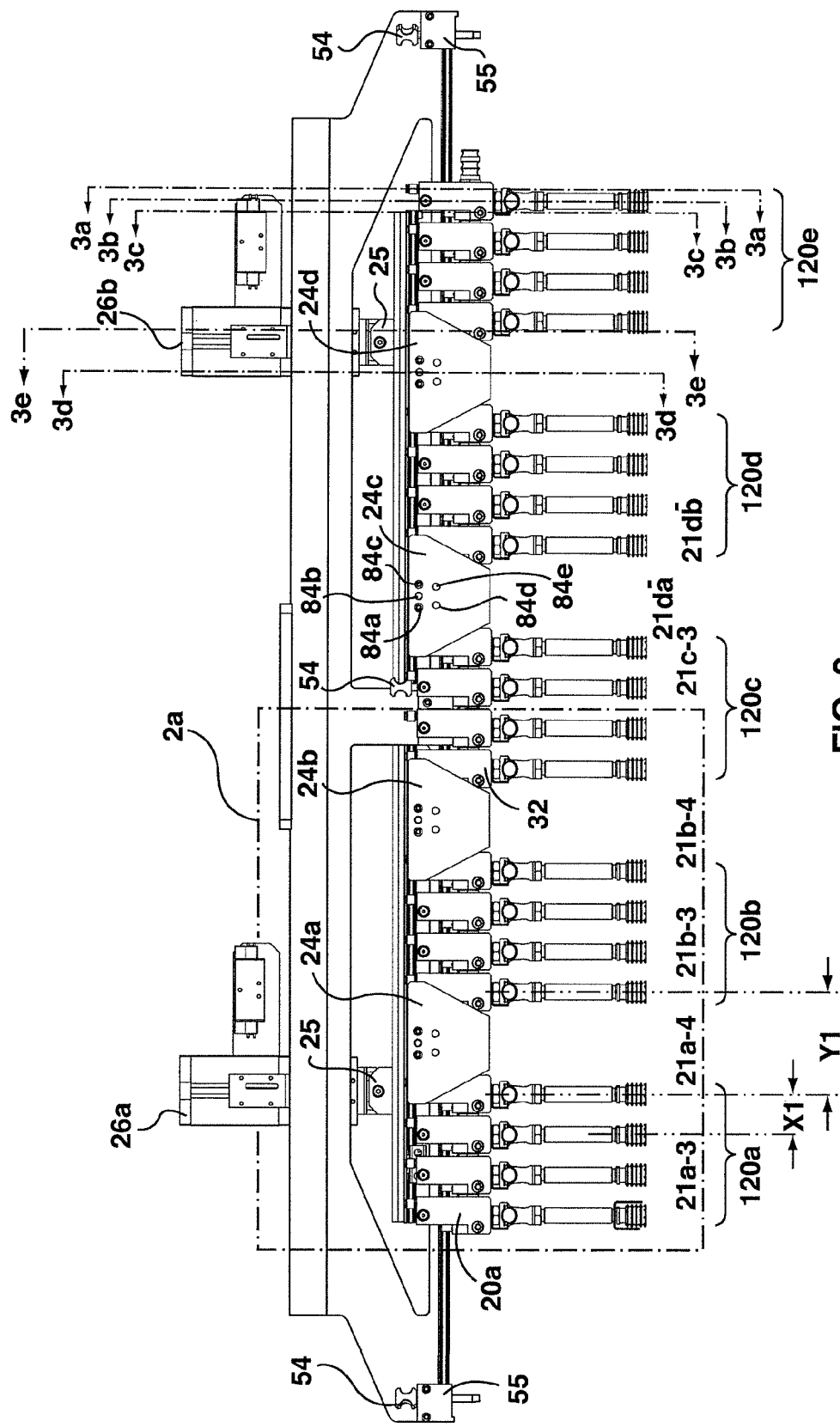

DEVICE WITH MULTIPLE ENGAGEMENT MEMBERS

CROSS-REFERENCE TO RELATED APPLICATION

This application claims priority from U.S. provisional application No. 60/960,696, filed Oct. 10, 2007, the contents of which are hereby incorporated herein by reference.

FIELD OF THE INVENTION

The present invention relates to a device having multiple engagement members that can be used to engage and disengages plurality of items. The device may be adapted for use as an end effector that may be connected to an arm of an industrial robot.

BACKGROUND OF THE INVENTION

Devices for engaging multiple items are employed in many different industries. In the packaging industry, a device that is part of a packaging system may be used to pick up items from a first location and deposit the items at a second location. For example, a plurality of items may be picked up from an item delivery lugged conveyor where the items are spaced at a first pitch, and then deposited into a container. In some packaging systems it may be necessary that at the second location, the items be spaced at a second pitch that is the same as the first pitch. In other systems, it may be necessary that at the second location, the items be spaced at a second pitch that is different from the first pitch.

It is often desired to retrieve and/or form the items obtained at the first location into separate groups of items such that each group has its items spaced at an item pitch. This item pitch is usually, but not always constant. Additionally each of the groups may be spaced apart from each other at a particular group pitch. The group pitch may be constant or variable between the groups (e.g. the spacing between a first group and a second group, may or may not be the same as the spacing between the second group and a third group. For example, the items may be deposited into receptacles that only accept a certain number of items. Thus, the items may have to be separated into groups for deposit into different receptacles, and it may be necessary to change the group pitch to accommodate the same.

During actual operation of a particular system in a particular "set-up", in many situations it may not be necessary that the pitch between individual items in each group vary, but only that the pitch between the distinct groups be adjusted. However, it may be desirable to provide a system that can be relatively easily reconfigured, so that the system can also be operated to handle items that have a different item pitch spacing. Thus it is desirable to have a packaging system where the set-up of the item pitch can be readily modified.

It is known to employ a robot with a robot arm having an end effector mounted to its distal end. Such an end effector may have multiple pick up members, each pick up member having a mechanism, such as a suction cup, at its end for engaging an item. The pick up members may be arranged in a single line or may be arranged in an array of two or more lines. Moreover, it is often required that each pick up member be can be specifically positioned so that items may be accurately engaged and deposited in a particular manner.

Previous designs of end effectors capable of forming items into at least two groups include devices having single large cam slotted plates attached to the frame of the end effector. A cam follower was typically attached to each pick up member, and each follower was received in an individual slot in the slotted plate. Various grouping configurations were accomplished by varying the configuration of the slots in the plate.

However, there are drawbacks in having a single long cam plate with different cam slot angles. For example, to provide a given longitudinal arrangement of pick up members, pick up members at one location of a device may need to move longitudinally further than pick up members elsewhere. However, there will be a constraint in the angle of the slots (i.e. the slots can not be too shallow, otherwise the cam action will be difficult due to the forces being applied between the cam follower and the cam slot). To maintain a non-locking cam slot angle, the solution has been to make the cam plate relatively deep. However, this substantially increases the overall weight of the device. Additionally, having a relatively larger latitudinal travel distance, means that the cam followers may achieve a higher velocity when travelling in the slot and a significant shock force may be created when the cam follower is "bottoming out" or otherwise brought to a stop in the cam track.

It is also desirable, particularly in the packaging industry, to have devices which can be readily modified to enable them to be easily reconfigured to accommodate differences in an overall system set up. The set up required for the device in a particular system may have to take into account variations in one or more of: (a) the number of items to be picked up at the first station; (b) the pitch of the items at the first station; (c) the retrieval in, and/or the formation of, items into groups; (d) the configuration of the groups of items including the number of items in each group, the number of groups; and the spacing between the groups at the first location and at the second location. However, existing devices are not easily adapted to accommodate changes required to one or more of these parameters.

In view of the foregoing, improved devices for engaging and disengaging multiple items are desirable.

SUMMARY OF THE INVENTION

According to one aspect of the invention, there is provided an apparatus for engaging and releasing a plurality of items comprising: (a) a frame having a longitudinally extending support member; (b) at least one group of engagement units each engagement unit having at least one engagement member, the at least one group comprising a plurality of engagement units each for engaging, and disengaging from at least one item, each of the engagement units mounted in series for longitudinal movement on the longitudinal support member, each one of the plurality of engagement units being interconnected to at least one other of the plurality of engagement units; (c) a movement apparatus for engaging not all of the plurality of engagement units in said group to displace the group longitudinally on the longitudinal support member.

According to another aspect of the invention, there is provided an apparatus for engaging and releasing a plurality of items comprising: (a) a frame having a longitudinally extending support member; (b) at least one group of engagement units each having at least one engagement member, the at least one group comprising a plurality of engagement members each for engaging, and disengaging from at least one item, each of the engagement units mounted in series for longitudinal movement on the longitudinal support member, each one of the plurality of engagement units being interconnected to at least one other of the plurality of engagement units; (c) a movement apparatus for engaging not all of the plurality of engagement units in the group to displace the group longitudinally on the longitudinal support member; wherein a first engagement unit in the at least one group is interconnected to a second engagement unit with a releasable connection mechanism.

BRIEF DESCRIPTION OF THE DRAWINGS

In drawings illustrating by way of example only, embodiments of the invention:

FIG. 2 is a front elevation view of the end effector of FIG. 1 with pick up members configured into five separated groups, each group having four pick up members;

DETAILED DESCRIPTION

Figure 11:
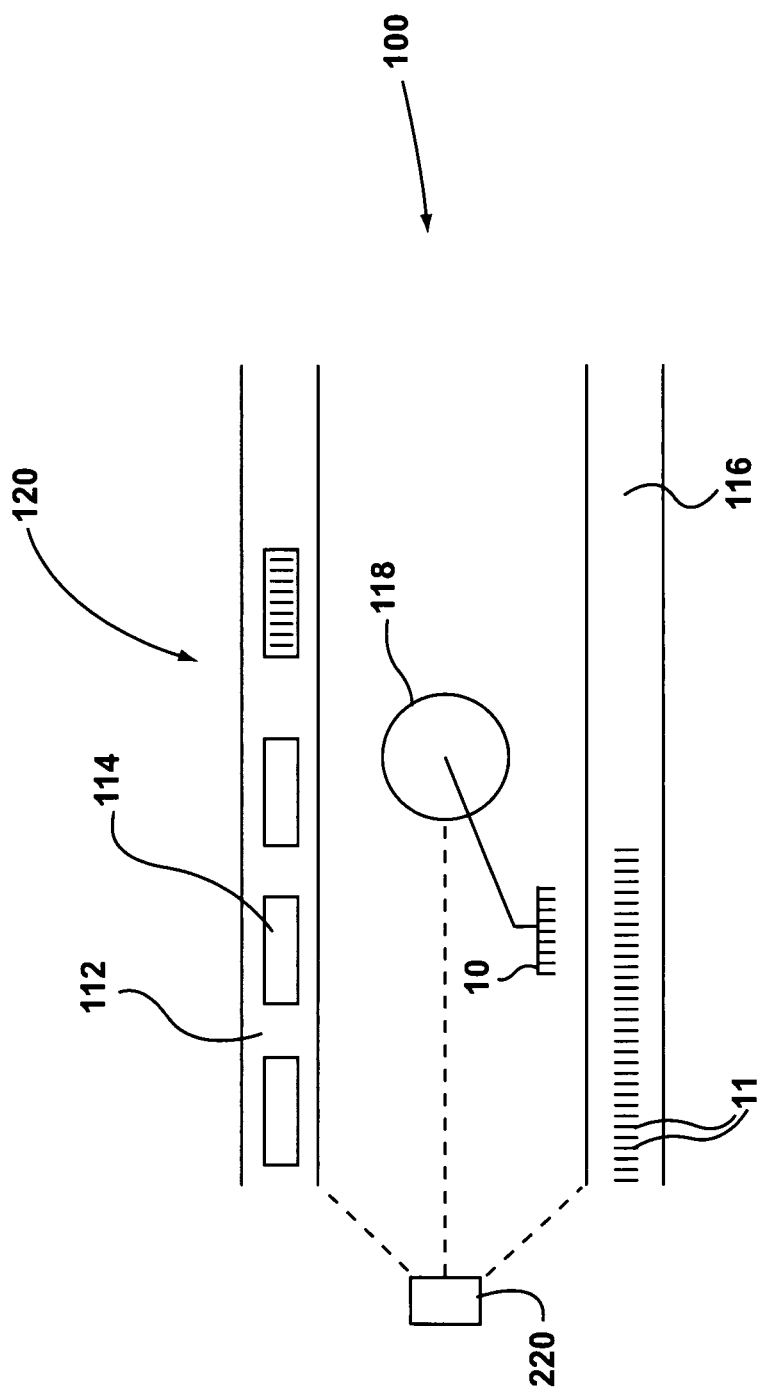
FIG. 11 is a schematic plan view of part of a packaging system employing the end effector of FIG. 1.

With reference first to FIG. 11, a part of a packaging system 100 includes a carton conveyor 112 that delivers open topped cartons 114 to loading station 120. Item delivery conveyor 116 delivers items 11 in series to loading station 120. An industrial robot 118 having a device 10 is adapted for picking up items 11 from conveyor 116 and transferring the items 11 into containers 114 carried on conveyor 112. The robot may be any suitable robot such as the model M420i made by Fanuc Robotics. The entire packaging system may be controlled by a controller 220 such as a PLC Controller made by Allen Bradley.

With reference to FIGS. 1, 2, 3 and 3a-3d, a device 10 for engaging multiple items 11 may be configured as an end effector for an industrial robot. End effector 10 may have a frame 12 that may have a mounting block 16 interconnected (such as for example by bolting or other suitable mechanisms) to the upper surface of a channel member 13 for mounting end effector 10 to a robot arm of the robot in a conventional manner.

Frame 12 may include longitudinally extending rectangular channel member 13 that is oriented generally transversely and interconnected (such as for example by bolting or other suitable mechanisms) to a generally latitudinally oriented and longitudinally extending channel member 17. Channel member 17 may be formed as a substantially rectangular channel with both side webs 17a and 17b having portions removed/omitted to reduce the overall weight of the end effector. Channel members 13 and 17 may be made from a strong but relatively lightweight material like aluminum or other suitable material.

Channel member 17 may have latitudinally and longitudinally extending side webs 17a, 17b, an upper transversely and longitudinally extending web 17d, and a lower transversely and longitudinally extending web 17c. Secured to the bottom surface of web 17c, may be a support such as a longitudinally extending pick up member support member 14. Support member 14 may be a rail, part of a conventional linear motion system that may be manufactured by Star under model no. R1607 or THK under model no. SR15. Support member 14 may also be configured in other ways to permit longitudinal movement of members supported thereon. Support member 14 may engage a co-operating running block 31 mounted to the top of each of a plurality of pick up members 20. Running blocks 31 may be a conventional linear ball running block with ball rolling elements. A plurality of engagement units, that may be pick up units 21, may each have a pair of transversely spaced engagement members, such as pick up members 20 that depend from and which are supported on support member 14. Each pick up unit 21 may be adapted for sliding longitudinal movement along support member 14.

Figure 10:
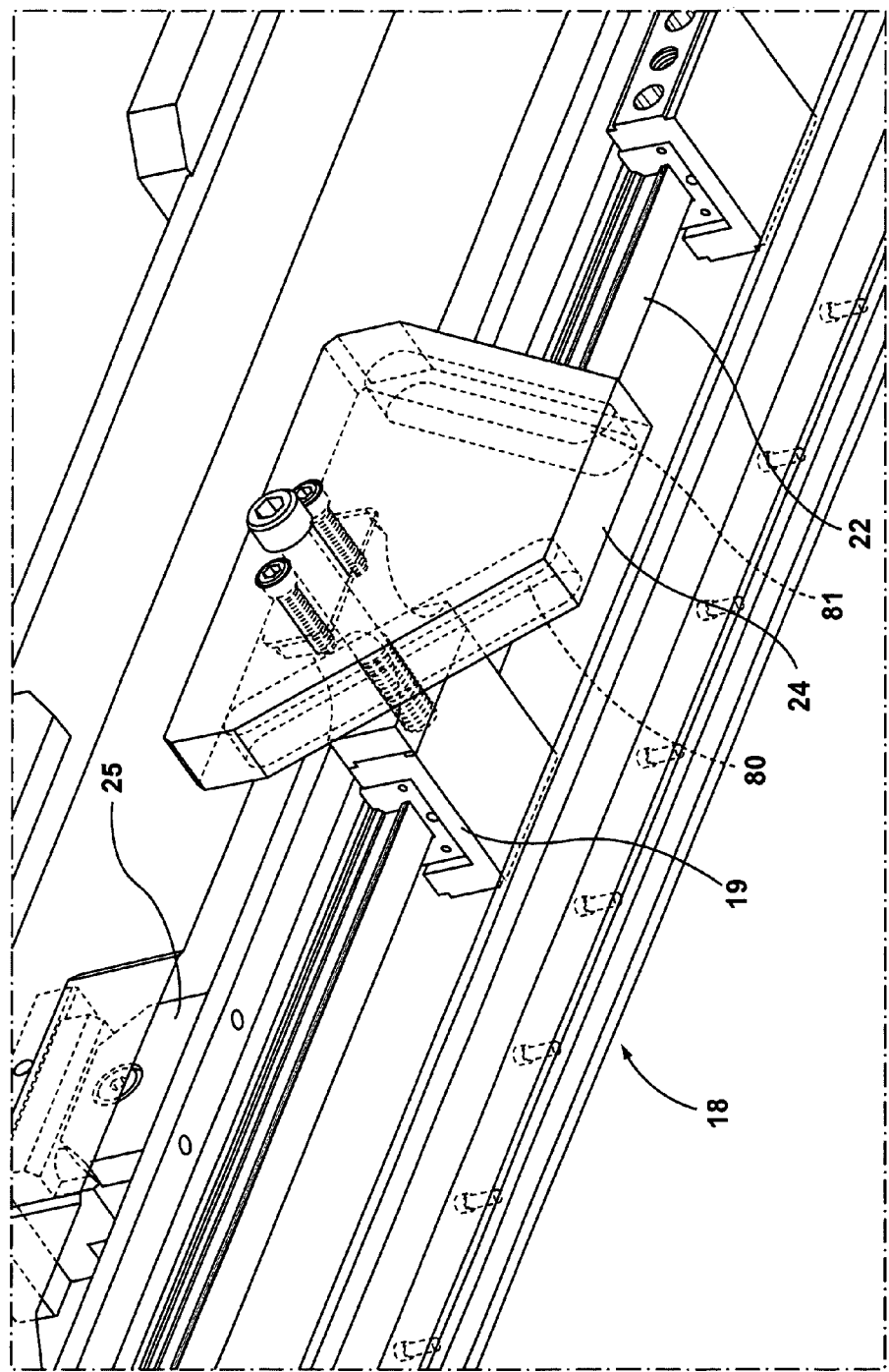
FIG. 10 is lower, semi-transparent bottom perspective view of part of the end effector of FIG. 1.

End effector 10 also has a pick up member movement apparatus, generally designated as 18 (FIG. 10) which may be configured to engage at least one but not all of a group of engagement units 21. Movement apparatus 18 may be characterized as a "pushing device" which may be a cam device disposed between the frame and at least one of the pick up units. For example, movement apparatus may comprise a cam rail 22 secured to a support bar member 27, cam blocks 24a, 24b, 24c, and 24d (generally cam blocks 24) attached to cam spacers 101, cam running blocks 19, and actuating mechanisms 26a and 26b (generally actuating mechanism 26). Cam rail 22 and support bar 27 may be joined by conventional means interconnected (such as for example by bolting or other suitable mechanism) and both extend longitudinally in generally spaced parallel relationship to pick up member support rail 14. Cam running blocks 19 are mounted for longitudinal movement along cam rail 22, and consequently, cam blocks 24, which are mounted to cam running blocks 19, may also move longitudinally along cam rail 22. Cam spacer 101 transversely spaces cam block 24 from cam rail 22. Like support member 14, cam rail 22 may be a conventional rail or other support permitting longitudinal movement of members thereon.

Cam support bar 27 may be a relatively lightweight but strong material such as aluminum or other suitable material. Cam rail 22 and support member 27 may be attached to actuating mechanisms 26 by, for example, a bolt (not labelled) passing through a hole in each of brackets 25 and through a corresponding hole in the housing of actuation mechanism 26. Any other suitable mechanism of securing cam rail 22 to actuation mechanisms 26 may also be employed.

In the present embodiment, actuating mechanism 26 may comprise a pair of spaced double acting pneumatic cylinders 23 having reciprocating piston arms 29. An example of suitable cylinders are the model DFM 25 cylinder manufactured by Festo. Cylinders 23 may be mounted to frame 12 in a conventional manner such as by bolting or welding. Compressed air may be supplied to cylinders 23 by tubing (not shown) and may be controlled by valves (not shown) that themselves may be controlled by controller 220 (FIG. 11).

However, other suitable mechanisms that moves cam rail 22 in a reciprocating latitudinal movement may also be used, such as for example, a timing belt that is servo driven, or a rack and pinion apparatus.

Cam block 24 may be constructed from plastic materials such as, for example, UHMW (high-density polyethylene). With particular reference to FIGS. 1a and 1b, cam block 24 may be configured with two slots or tracks, 80 and 81, each of which may receive a cam element such as a cam follower 34 connected to one pick up unit 21. The tracks 80 and 81 may each have a latitudinal length D (FIG. 1b). Cam running block 19 may be rectangular with an open channel for receiving cam rail 22 (FIG. 1b). Running block 19 may be a conventional linear ball running block with ball rolling elements. The angle of the slots 80 and 81 should be configured such that the cam follower is not locked by the acting force from the actuators 26. Examples of suitable angles Delta (FIG. 1b) may be in the range of 35 to 45 degrees.

Cam block 24 may be connected to cam running block 19 by a bolt 100 (or other suitable fastener) passing through through hole 84b in cam block 24, through a corresponding hole in cam spacer 101, and into a hole in cam running block 19. Cam block 24 may be permanently connected to cam spacer 101 by passing a bolt 104 through hole 84a and bolt 115 through hole 84c. However, bolts 104 and 115 may not pass through the entirety of cam spacer 101. Holes 82a and 82c may be provided on cam running block 19 to lighten the weight of cam running block 19. Indeed, many components of end effector 10 may have spaces or holes, to reduce the overall weight of the device.

Furthermore, to facilitate adaptation of the device to accommodate a different overall packaging system set up, cam blocks with different configurations of slots 80 and 81 (for example, slots having different angles Delta) may be used to achieve different grouping pitches of pick up member units 21. To this end, two indicators 110 and 111 on cam block 24 may be provided. For example, indicators 110 and 111 may be coloured spots used to code a cam block having a specific slot configuration that will achieve a specific group pitch. The colour coding may enable a person setting up an end effector for a particular desired configuration to be able to easily select the appropriate cam block; this is particularly helpful when that cam block is stored with a plurality of cam blocks having different slot configurations. The cam blocks may be easily replaced simply by releasing bolt 100. It will also be appreciated that enhanced flexibility in device 10 being utilized in a packaging system 100 may be achieved because cam blocks between different groups of pick up members, may be selected so that they do not all have the same configuration of slots 80, 81.

Figure 1:
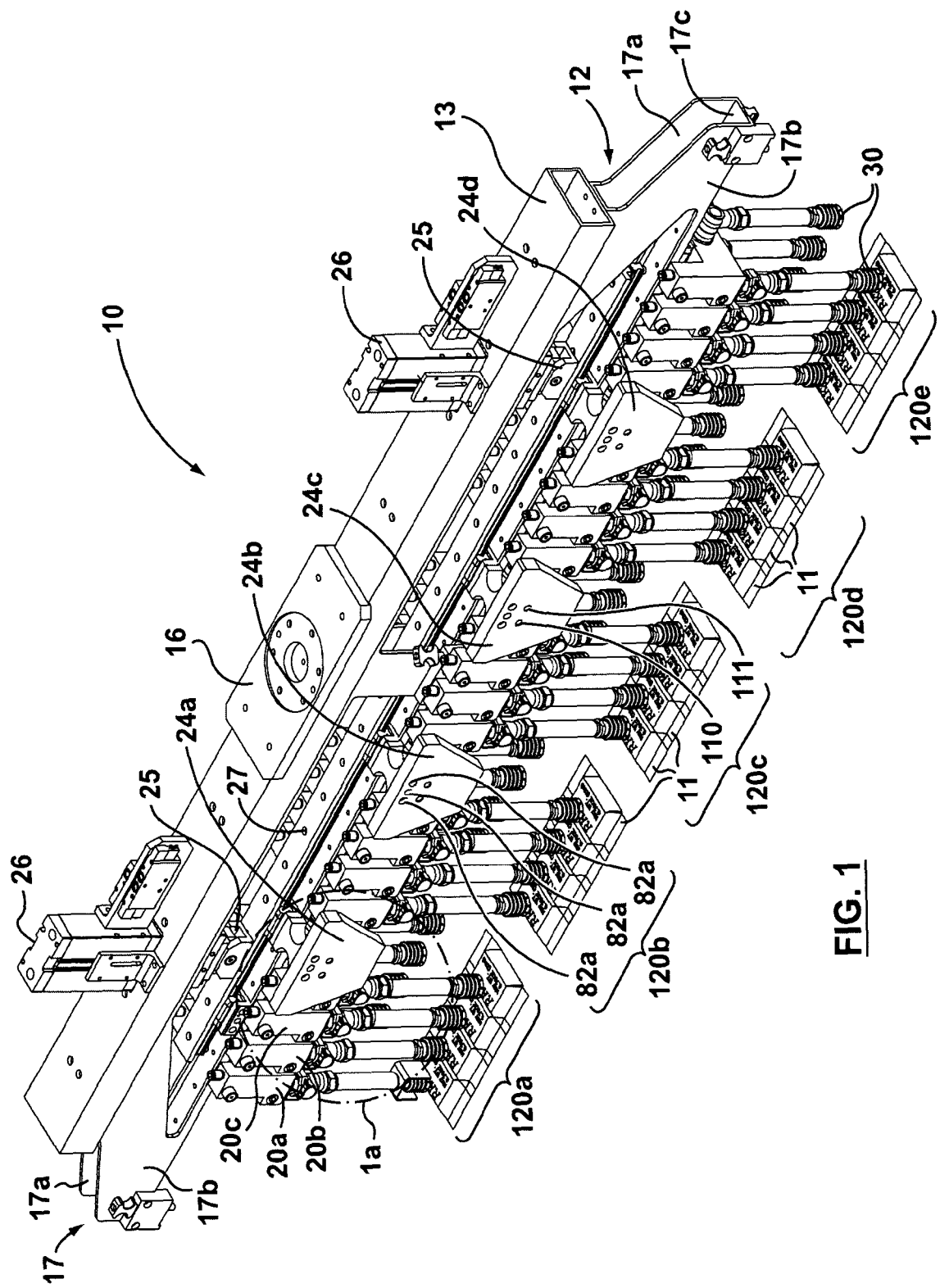
FIG. 1 is a perspective view of an end effector.
Figure 1A:
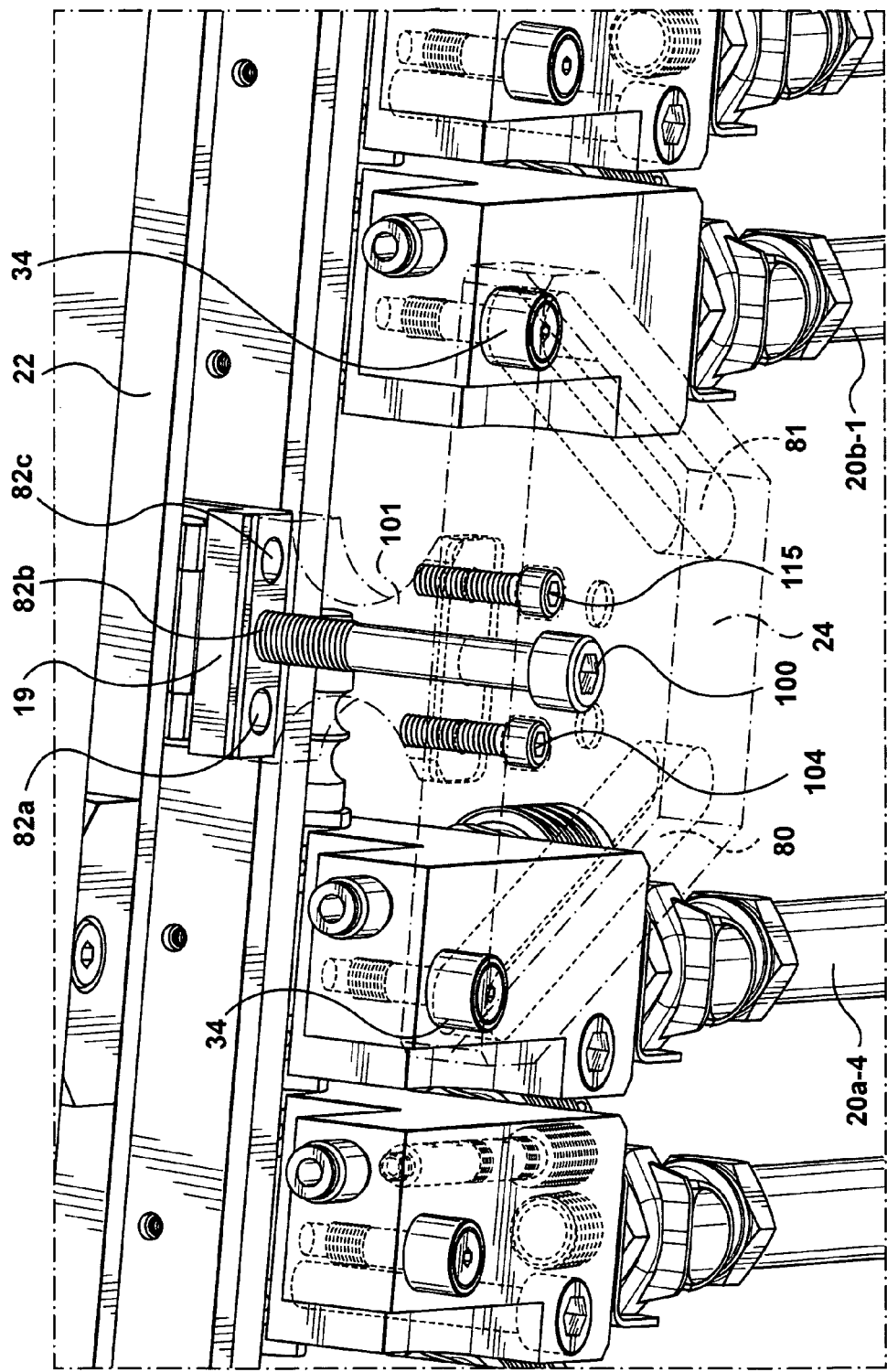
FIG. 1a is a perspective enlarged view of region 1a in FIG. 1.
Figure 1B:
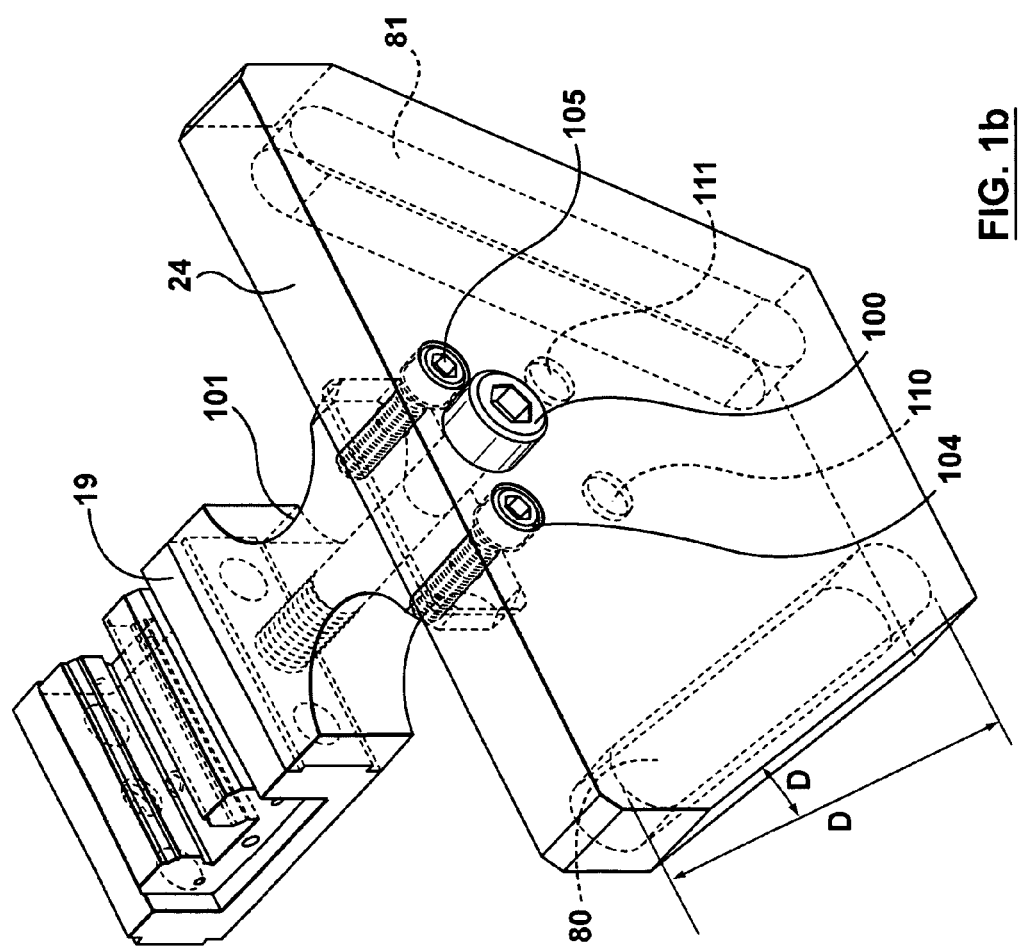
FIG. 1b is a perspective view of a cam block and cam plate in isolation.
Figure 2A:
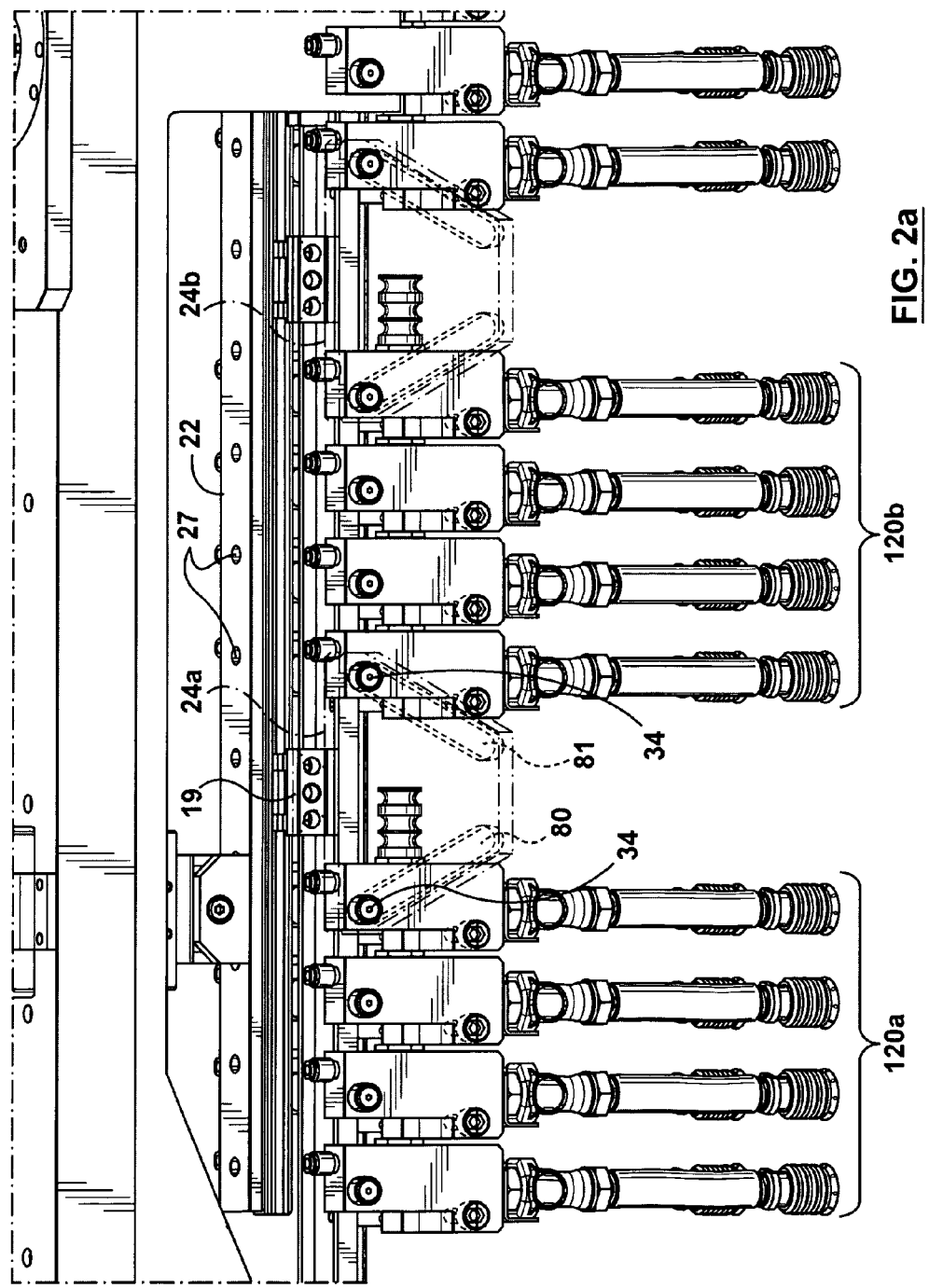
FIG. 2a is an enlarged view of region 2a in FIG. 2.
Figure 2B:
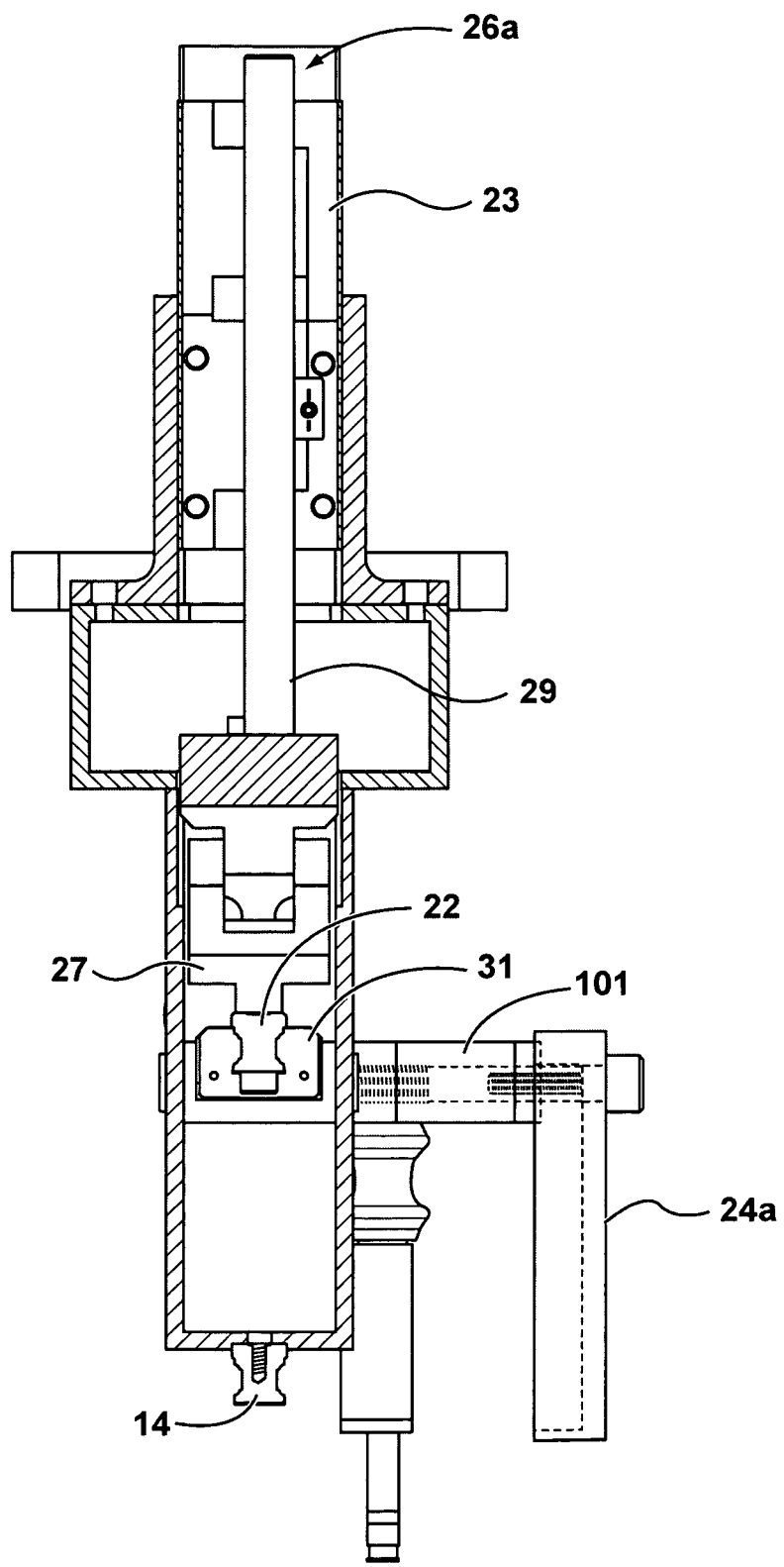
FIG. 2b is a transparent elevation view in cross section at line 3e-3e in FIG. 2, but with some lower components removed for illustration purposes.
Figure 3:
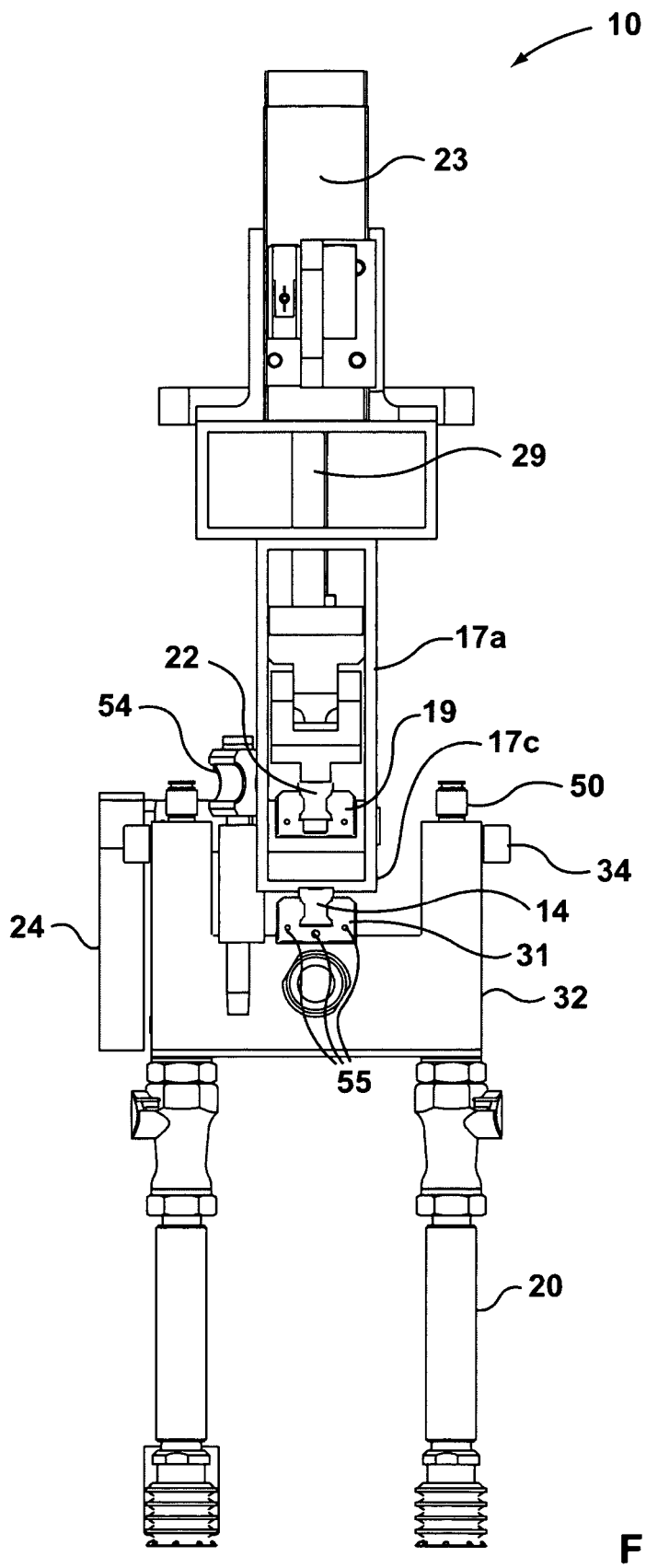
FIG. 3 is a right side elevation view of the end effector of FIG. 1.
Figure 3A:
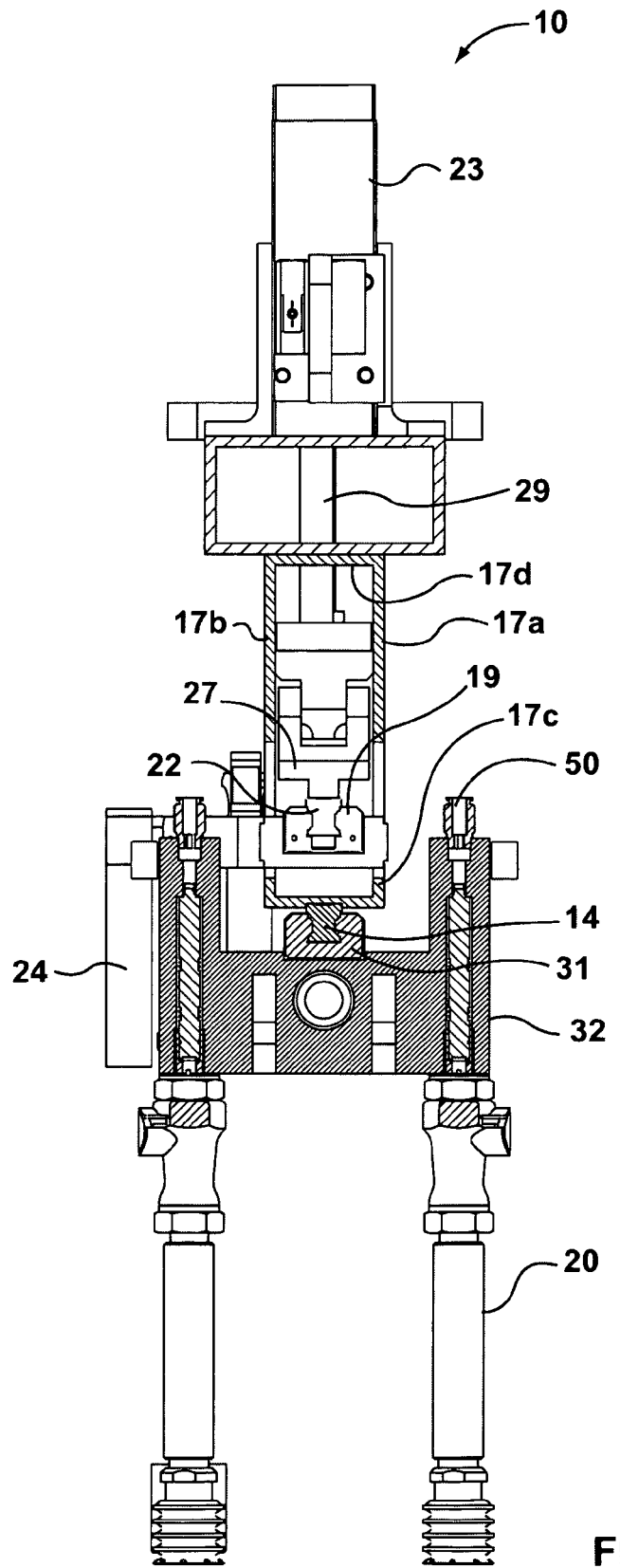
FIG. 3a is a side elevation view in cross section at line 3a-3a in FIG. 2.
Figure 3B:
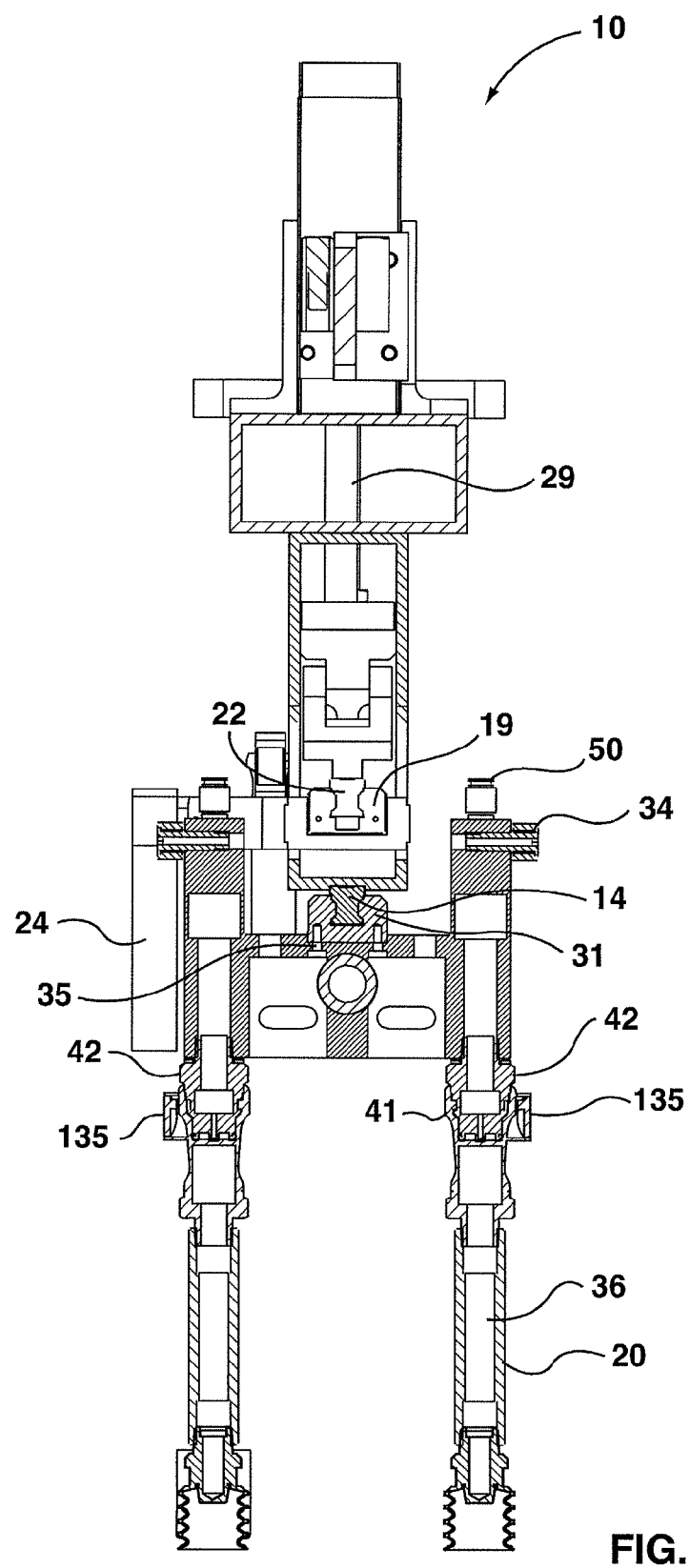
FIG. 3b is a side elevation view in cross section at line 3b-3b in FIG. 2.
Figure 3C:
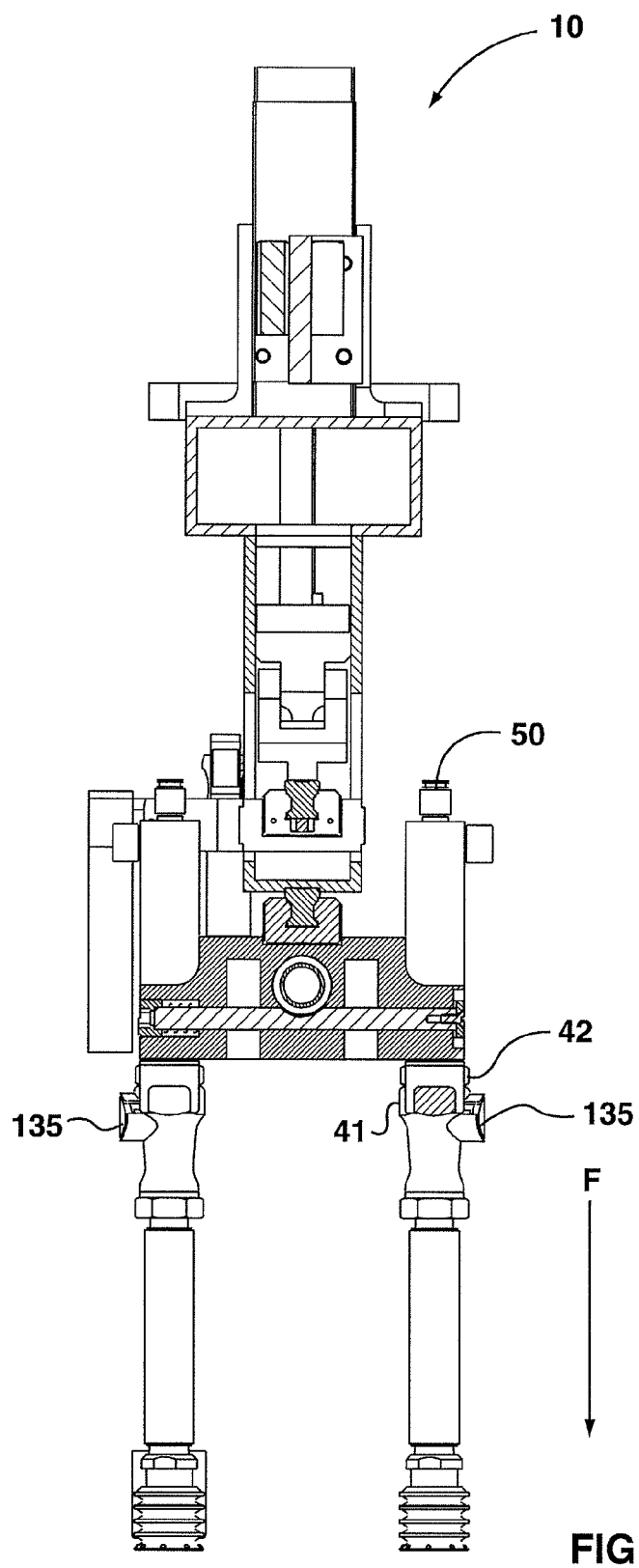
FIG. 3c is a side elevation view in cross section at line 3c-3c in FIG. 2.
Figure 3D:
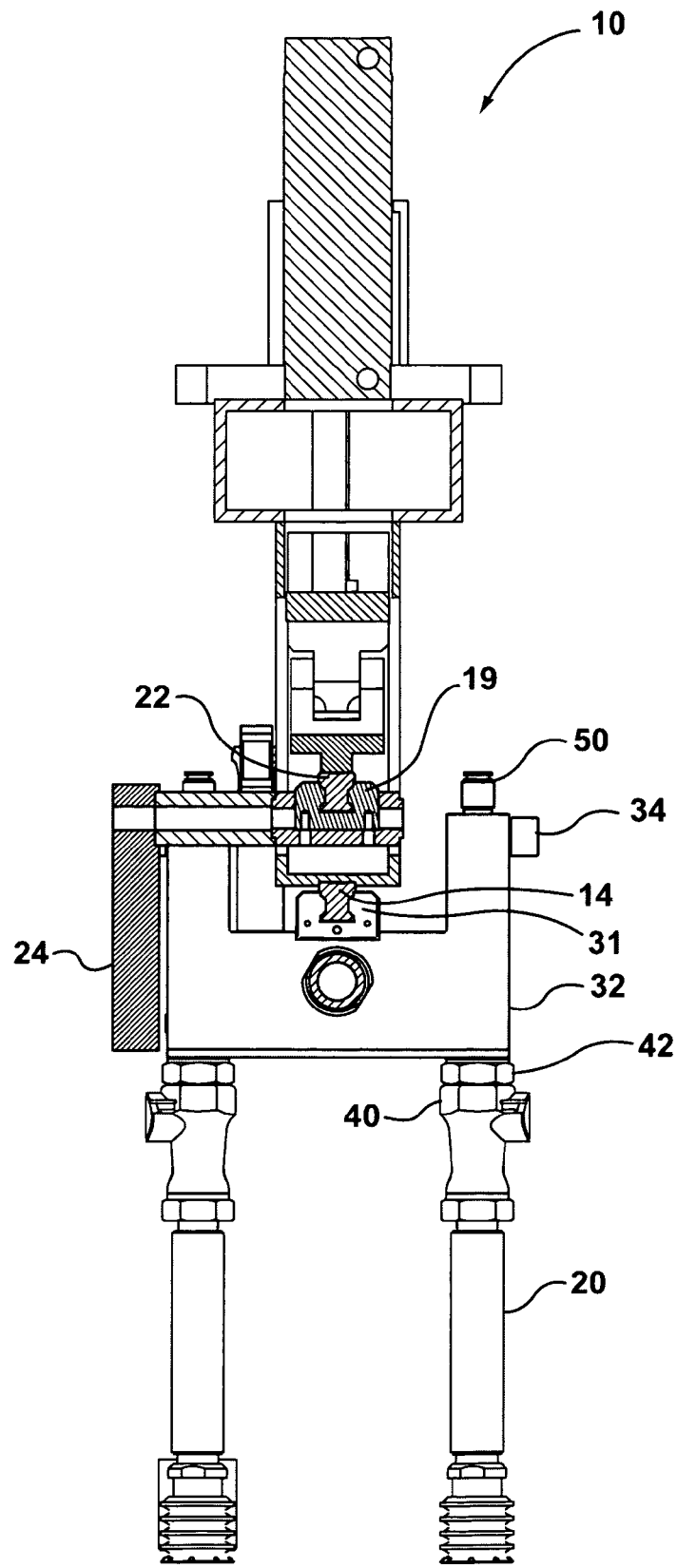
FIG. 3d is a side elevation view in cross section at line 3d-3d in FIG. 2.

As shown in FIGS. 1 and 2, each pick up unit 21 may have a pair of pick up members 20 disposed transversely to each other. Depending upon the desired application, each pick up unit 21 may alternatively have only one pick up member or more than two pick up members 20 arranged transversely and/or longitudinally. As illustrated, there may be a total of twenty (20) pick up units 21 arranged longitudinally in series on support member 14. Thus, in this embodiment there is a 2×20 array of pick up members 20. Moreover, as will be evident in FIGS. 1 and 2, the pick up members 20 may be separated into groups. Pick up members 20 may be arranged in five groups, each group having eight pick up members such as groups 120a, 120b, 120c, 120d and 120e.

Each adjacent pair of group of pick up members may be separated by a pair of transversely opposed spaced cam blocks 24. While only the set of cam blocks on the front side is shown in FIGS. 1 and 2, in practice, cam blocks may be attached to both sides of cam rail 22, or be placed on alternate sides of cam rail 22, to balance the forces acting in the device 10. Furthermore, it may be appreciated that by employing several cam blocks 24 on cam rail 22 effectively in series between each of the adjacent groups of pick up members 120a-e, the overall latitudinal distance that the cam follower 34 needs to travel (e.g. maximum of D—FIG. 1b) to cause the outer groups 120a and 120e to move may be significantly less than if a single cam plate is used where each of the groups are interconnected only to the single cam plate. This overall reduction in latitudinal travel, can reduce the amount of shock felt in the device 10, when the cam followers on each pick up member reach the end of the cam slot 80 or 81, during movement of the cam rail 22. Additionally, by not having a big cam plate attached to it, the total weight of device 10 may be significantly reduced.

Figure 4:
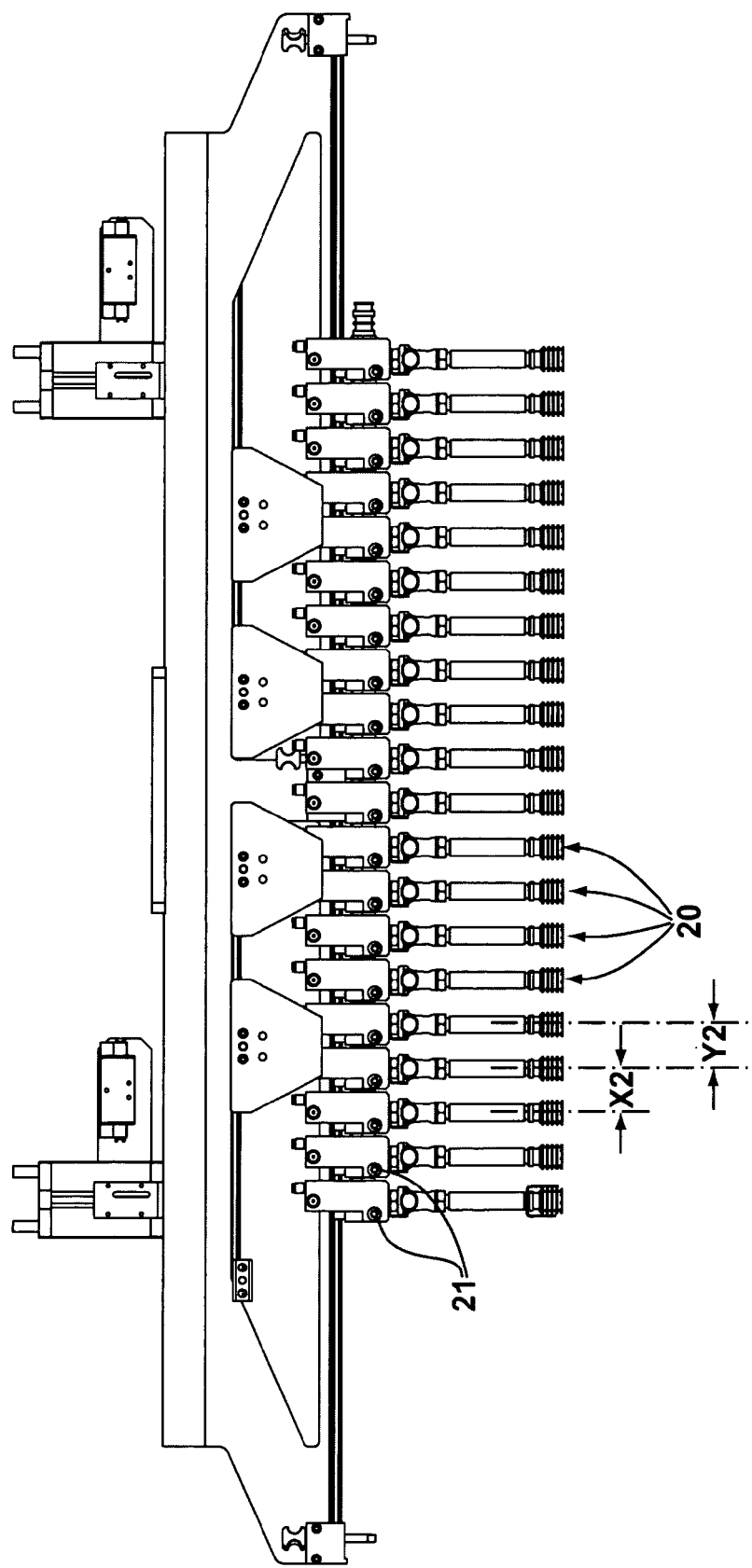
FIG. 4 is a front elevation view of the end effector of FIG. 1 that is similar to FIG. 2, at a reduced scale and with the pick up members in a closely spaced, non-grouped configuration.

As shown in FIG. 2, the longitudinal spacing between pick up members 20 within each group 120a-e (i.e. pick up member pitch) is designated as "X1" and may be the same within each group, and the same throughout the different groups. The longitudinal spacing between adjacent groups of pick up members (e.g. the space between group 120a and 120b) is called the group pitch and is designated in FIG. 2 as "Y1". As will be described in more detail hereinafter and with further reference to FIGS. 12a and 12b, the device 10 can modify the size of the group pitch while the packaging system is configured in a particular set up, and the system 100 is operational. For example, in FIG. 4, the group pitch has been altered to a distance Y2.

Additionally, when it is desired to change the item pitch due to a desire to change the overall system set up, this pick up member pitch alteration can be readily achieved.

As will be described further below, each pick up member 20 may have at its distal end a suction cup 30. Each pick up member 20 may have a bore 36 disposed therein through which a vacuum force may be applied at the outer surface of the suction cup 30. An item 11 (FIG. 1) may be engaged against suction cup 30 upon application of the vacuum force as the cup is placed close to or against a surface of an item.

With reference to FIGS. 3a, 3b, 3c, 9a and 9b, a pick up unit 21 may include a pair of transversely spaced pick up members 20 that may be releasably secured to mounting block 32. Each mounting block 32 in turn may have secured to it by bolts or screws 35 (or any other suitable fastener) a running block 31. Each respective running block 31 may have a central channel 133 which may engage support member 14 such that mounting block 32 is secured to support member 14 but can slide longitudinally along pick up support member 14.

Each mounting block 32 may be U-shaped, with two arm portions 33 separated by a central body portion 37. Mounting block 32 may be substantially symmetrical about an axis Z-Z that bisects the body portion 37 (FIG. 9a, 9b). As shown in FIGS. 3a-3c, 8 and 9b, each arm portion 33 may be formed with a latitudinally oriented, stepped cylindrical internal channel generally designated 39. An air inlet 50 of channel 39 may be provided at an upper end of each arm 33 and with a fitting 50 attached therein, and may be interconnected to and be in communication with a tube or tubes (not shown) carrying a source of pressurized air. The tube may be in communication with a rotary joint (such as for example one that is like or similar to the connection described and illustrated in U.S. patent application Ser. No. 11/477,466 entitled Rotary Union Connection, [published as publication no. US 2008/0003092 on Jan. 3, 2008) the contents of which are hereby incorporated herein by reference), in order to provide the pressurized air. An air outlet 74 may be provided at a lower end of channel 39. A vacuum generator cartridge 38, such as Pi12-3 manufactured by Piab may be disposed in channel 39 in each arm 33. Vacuum cartridge 38 is in communication with upper air inlet 50 and lower air outlet 74.

Additionally, a secondary air channel 47 that is also latitudinally oriented may have an outlet 49 at an upper end that is in communication with the inputs 73 of vacuum generator cartridge 38 that is held in channel 39. A lower inlet in air channel 47 may be in communication with a bore 36 formed in a pick up member 20. A vacuum force at suction cup 30 may be created in the following manner (FIG. 8a): pressurized air may be supplied through air inlet 50 from the tube (not shown) which may be in communication with a pressurized air source. The pressurized air may be forced through vacuum generator cartridge 38 and out of air outlet 74. As the high-pressure air flows downwards to air outlet 74 through vacuum cartridge 38, lower pressure or ambient air may be drawn through up through suction cup 30, through bore 36 in pick up member 20 and into air inlets 73 on vacuum cartridge 38. Consequently, a vacuum force can be created at suction cup 30 by a venturi effect. An item 11 may therefore be engaged against suction cup 30 by the application of the vacuum force against the item, and disengaged by curtailing the vacuum force. However, pick up members 20 may utilize other types of engagement and disengagement devices.

It will also be noted from FIGS. 3a-3c and 8 in particular that each block 32 of each item pick up unit 21 may have cam followers 34 that extends from the upper outside face of each arm 33. Cam followers 34 may be received in slot 80 or 81 in cam block 24 and may be a conventional roller bearing cam follower.

Although mounting block 32 may be adapted to slide along support member 14, it may sometimes be desirable to lock a particular mounting block (and the pick up member that is attached to the mounting block), or a group of pick up members, relative to support member 14 such that the mounting block is prevented from sliding along support member 14. The result can be that the all the other groups of pick up members may move longitudinally along support member 14 relative to the fixed pick up member group. To this end, a pin 54 may be inserted into a lock box 55 attached to support member 14 (for example, with bolts) and received in hole 105 in mounting block 32 (FIG. 9a). As illustrated in FIG. 2, three pins 54 and associated lock boxes 55 may be located along support member 14; one at each end of support member 14, and one approximately in the middle of support member.

Figure 7:
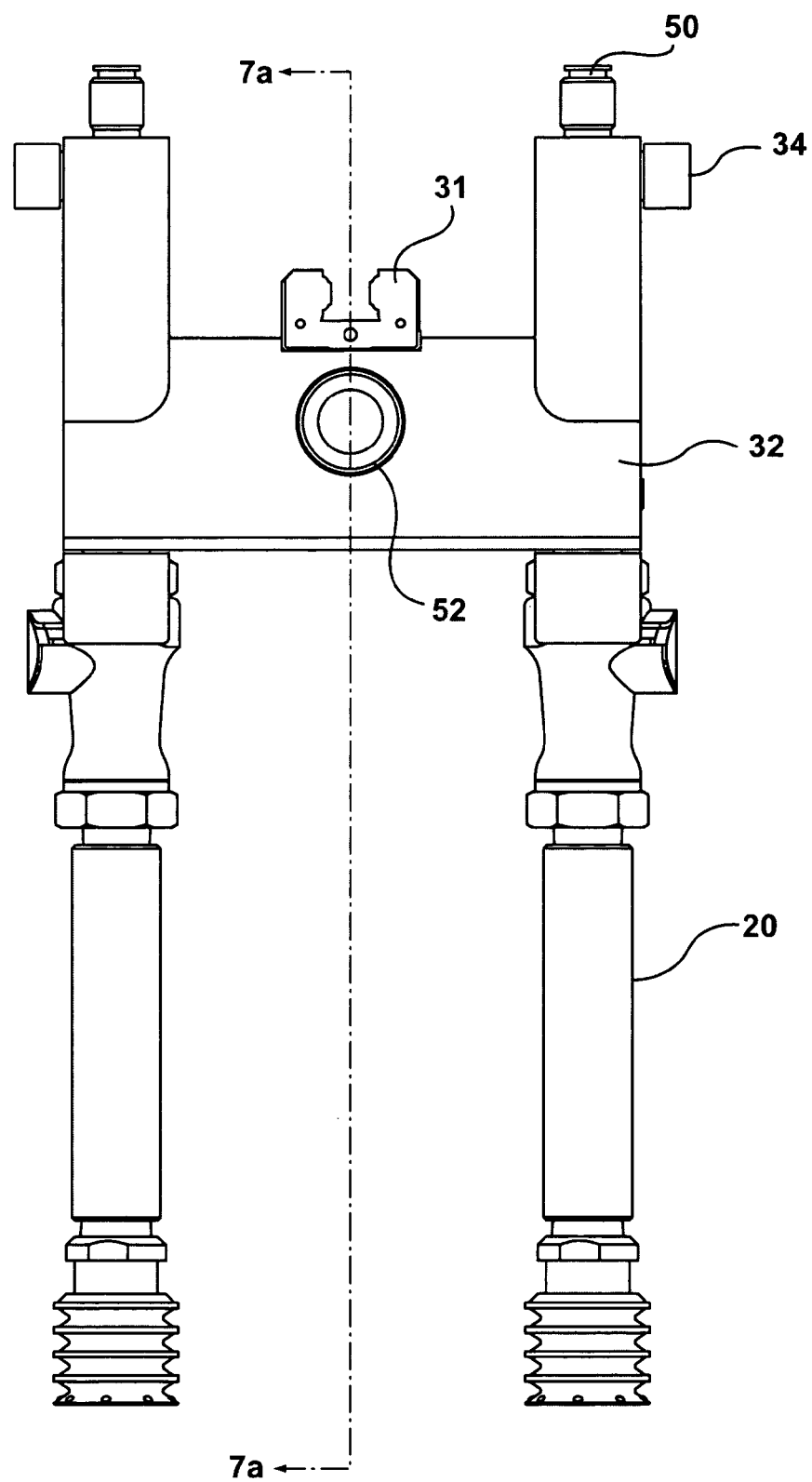
FIG. 7 is a side elevation view of a pair of interconnected pick members of a group of pick up members, shown in isolation.
Figure 7A:
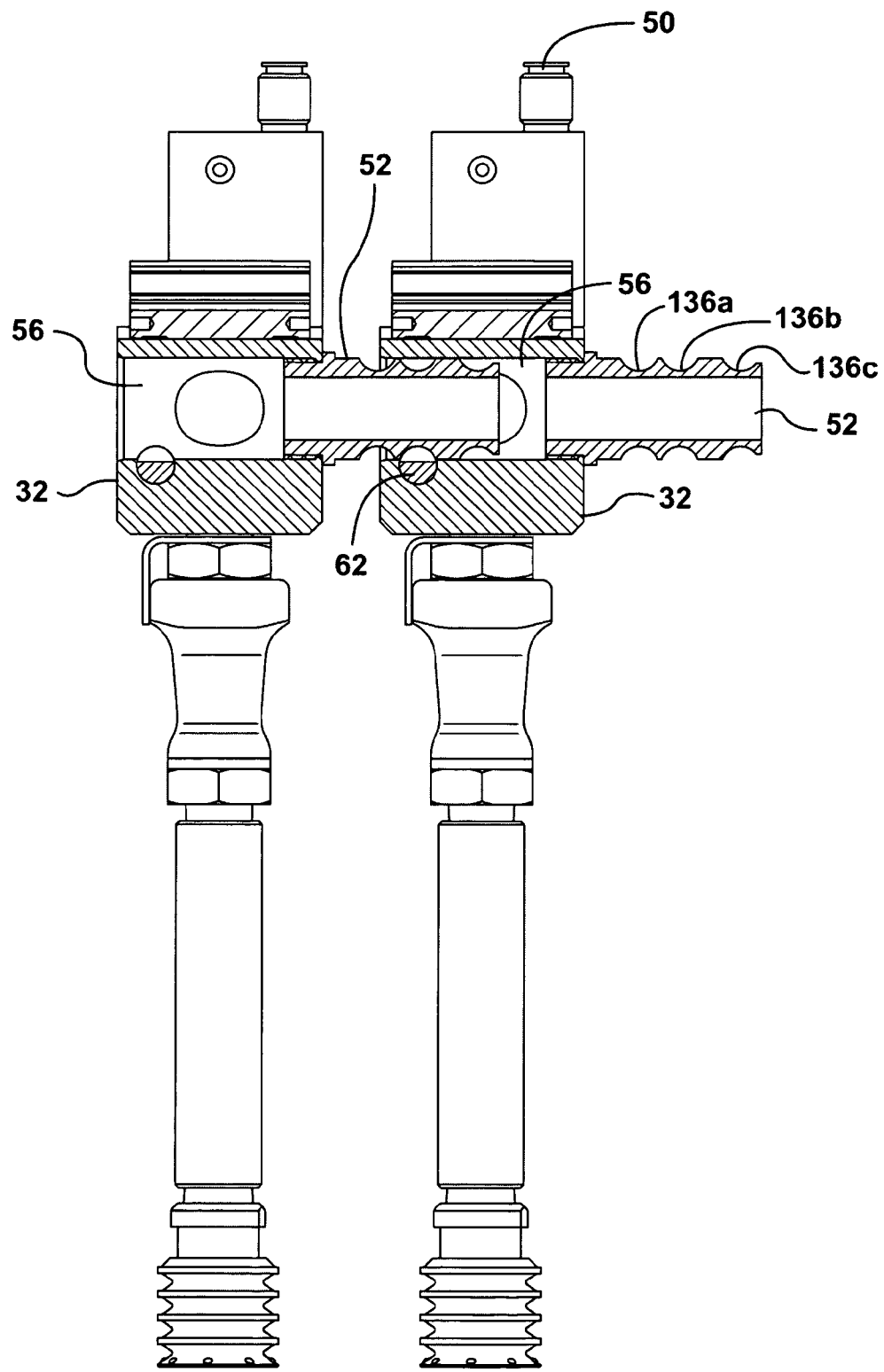
FIG. 7a is a cross section view of the pick up members of FIG. 7 taken at line 7a-7a in FIG. 7.
Figure 7B:
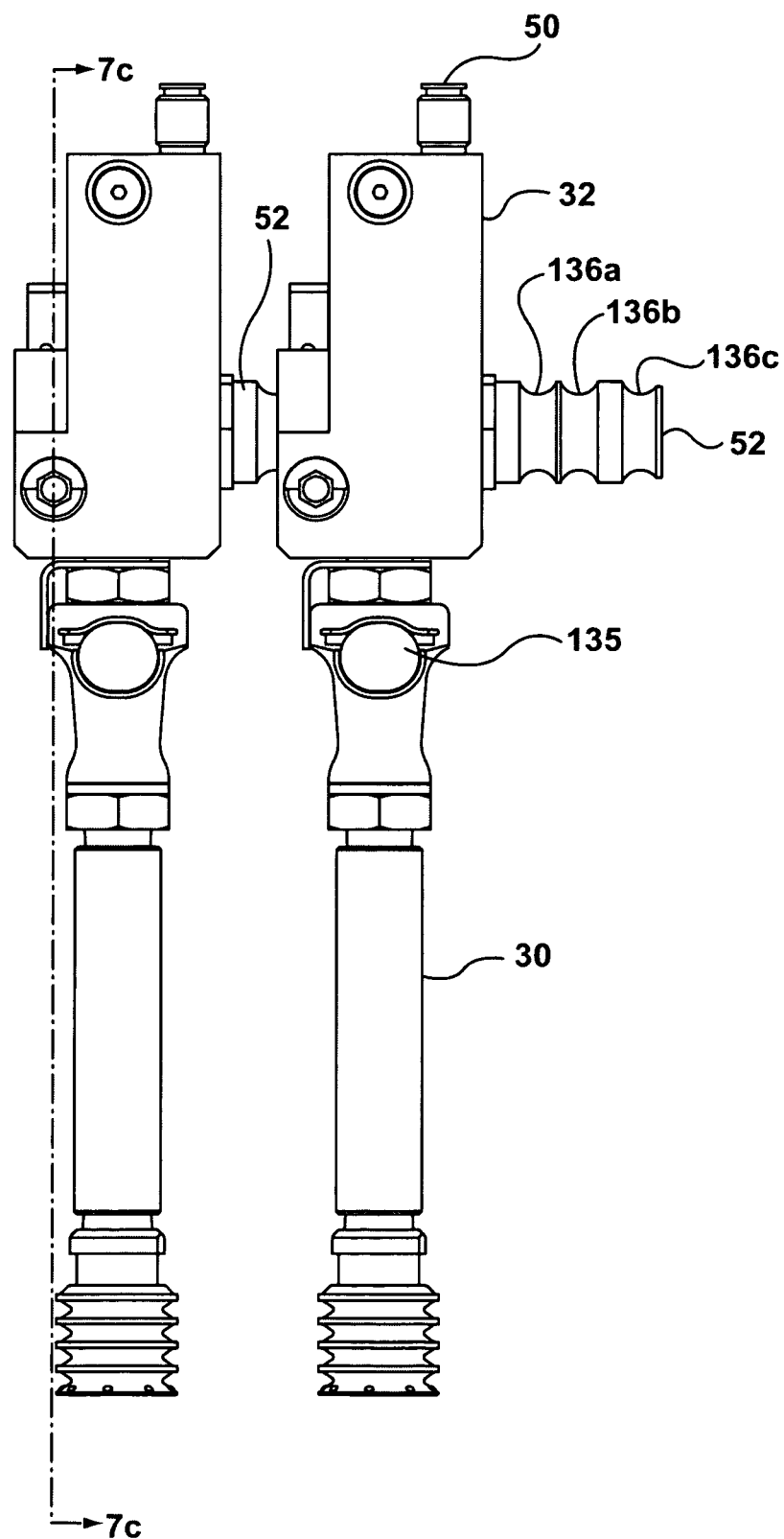
FIG. 7b is a front elevation view of the pick up members of FIG. 7.
Figure 8:
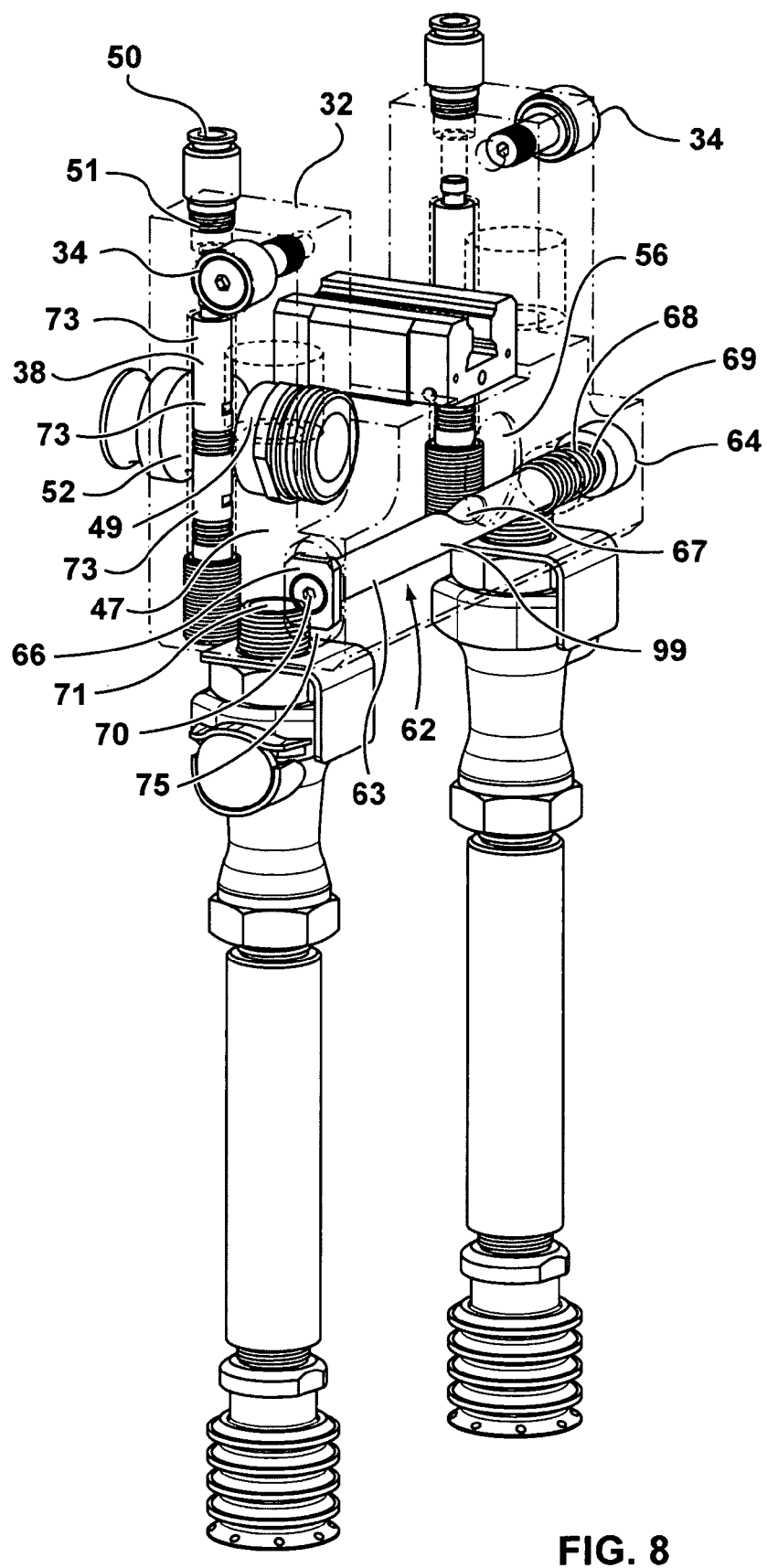
FIG. 8 is a semi-transparent perspective view of a pick up member that is part of the end effector in FIG. 1.
Figure 8A:
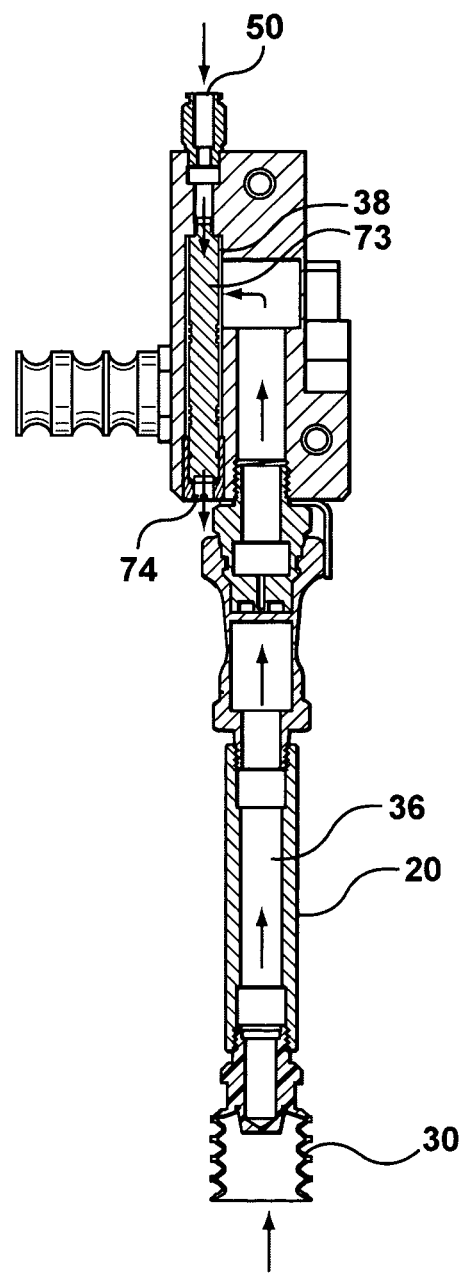
FIG. 8a is a semi-transparent back elevation view of part of the pick up member of FIG. 8.
Figure 9A:
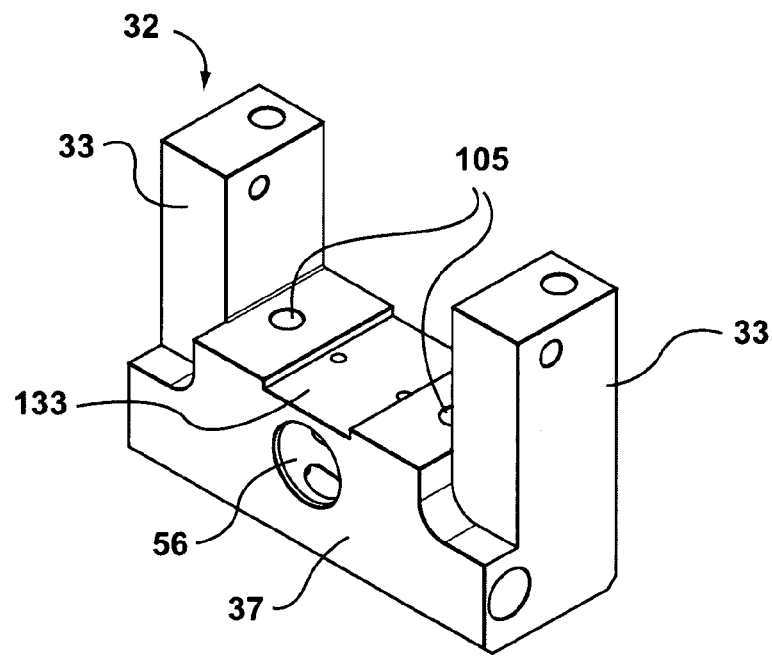
FIG. 9a is a perspective view of part of the pick up member of FIG. 1.
Figure 9B:
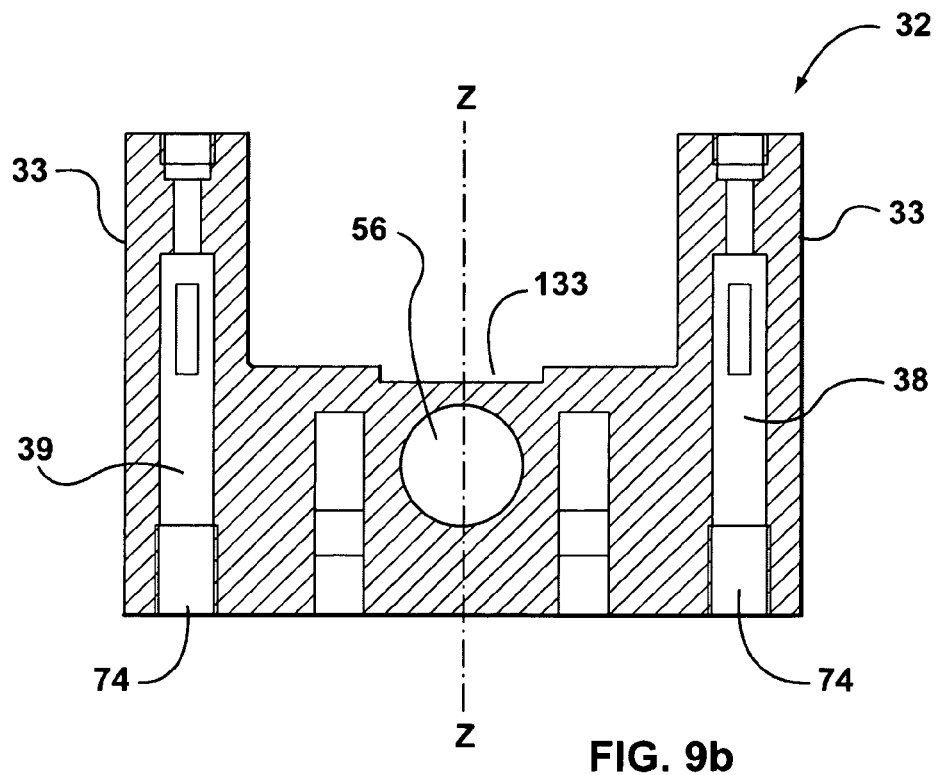
FIG. 9b is a cross sectional view of part of the pick up member of FIG. 1.

Turning again to the internal configuration of each mounting block 32, a longitudinal bore 56, running parallel to support member 14, may span the inside of body portion 37 (FIGS. 8, 9a, 9b). A protrusion device or protrusion member such as for example cylindrical bushing 52 may be used to connect adjacent mounting blocks 32 (and attached pairs of pick up members 20) at a particular item pitch X1 (FIG. 2). Moreover, by connecting a number of mounting blocks 32 together in series as shown in FIGS. 7a and 7b, two or more connected pick up member units 21 may be formed into groups 120a-e of pick up members. Thus by moving one pick up member unit 21 in a group 120a-e longitudinally, all pick up members in that group may also be moved the same distance simultaneously. The movement of one pick up member unit 21 may be achieved by operation of the actuating mechanism 26, such that for example, a cam block engaged to a cam follower attached to a one pick up member unit 21 of the group can cause the entire group to move longitudinally.

Figure 5:
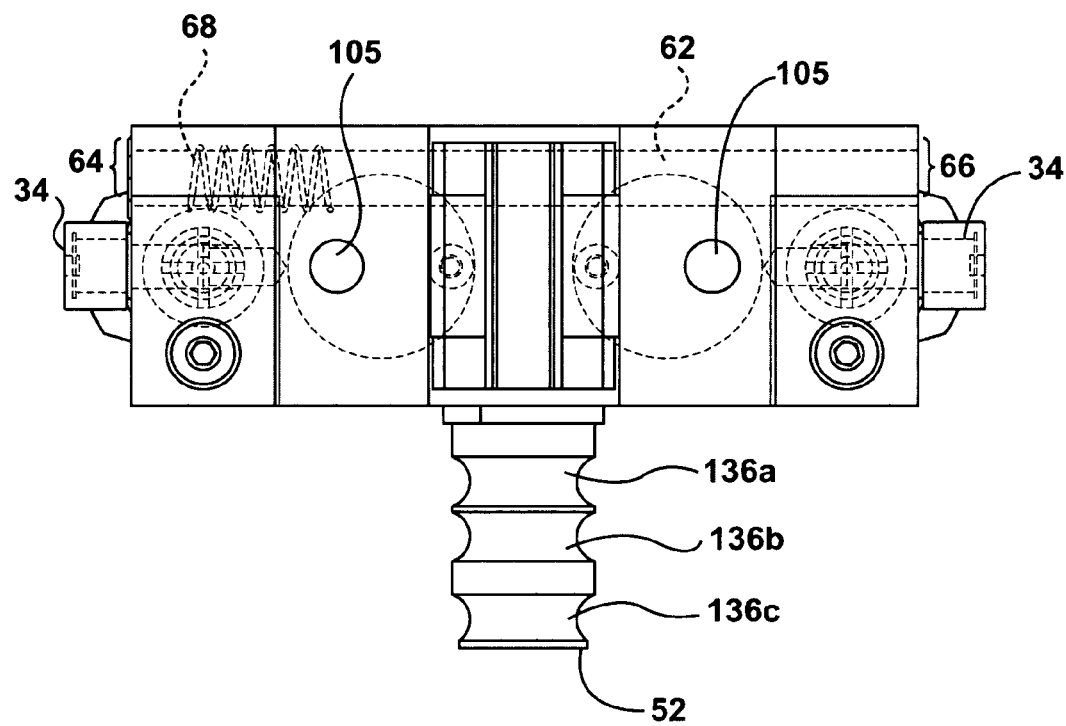
FIG. 5 is a semi-transparent top view of the pick up member in the end effector of FIG. 1.
Figure 6:
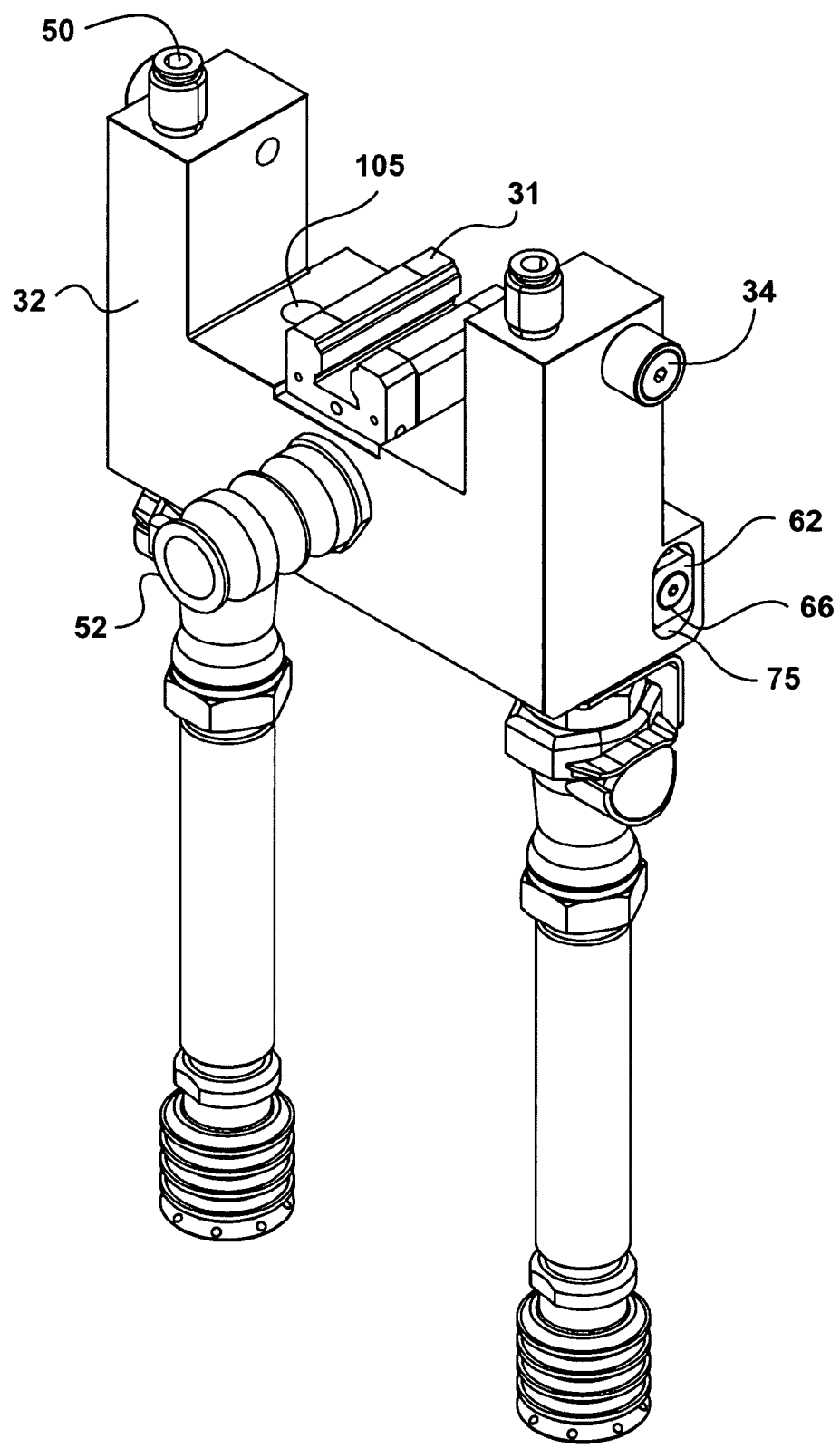
FIG. 6 is a perspective view of the pick up member of FIG. 5.

An example structure of cylindrical bushing 52 is illustrated in FIGS. 5 and 6. As illustrated, cylindrical bushing 52 may be a hollow cylindrical tube that is grooved (136a, 136b, 136c, generally 136) on its outer surface. Bushing 52 may also be a solid tube and moreover may have other configurations than a cylindrical tube. For example, bushing 52 may also be a solid rectangular bar with holes serving the same function as grooves 136. As further described below, grooves 136 can co-operate with a locking pin 62 to maintain mounting block 32 at a consistent distance (pitch) from an adjacent mounting block 32 and thus provide and maintain a specified item pitch.

Furthermore, bushing 52 may have threads at one end by which it may be threaded into corresponding threads on the inside face of bore 56. However, bushing 52 may also be attached to bore 56 in any other suitable manner. Bushing 52 thus protrudes from one side of body portion 37. The opposite side of bore 56 may receive a cylindrical bushing protruding from an adjacent mounting block.

Figure 7C:
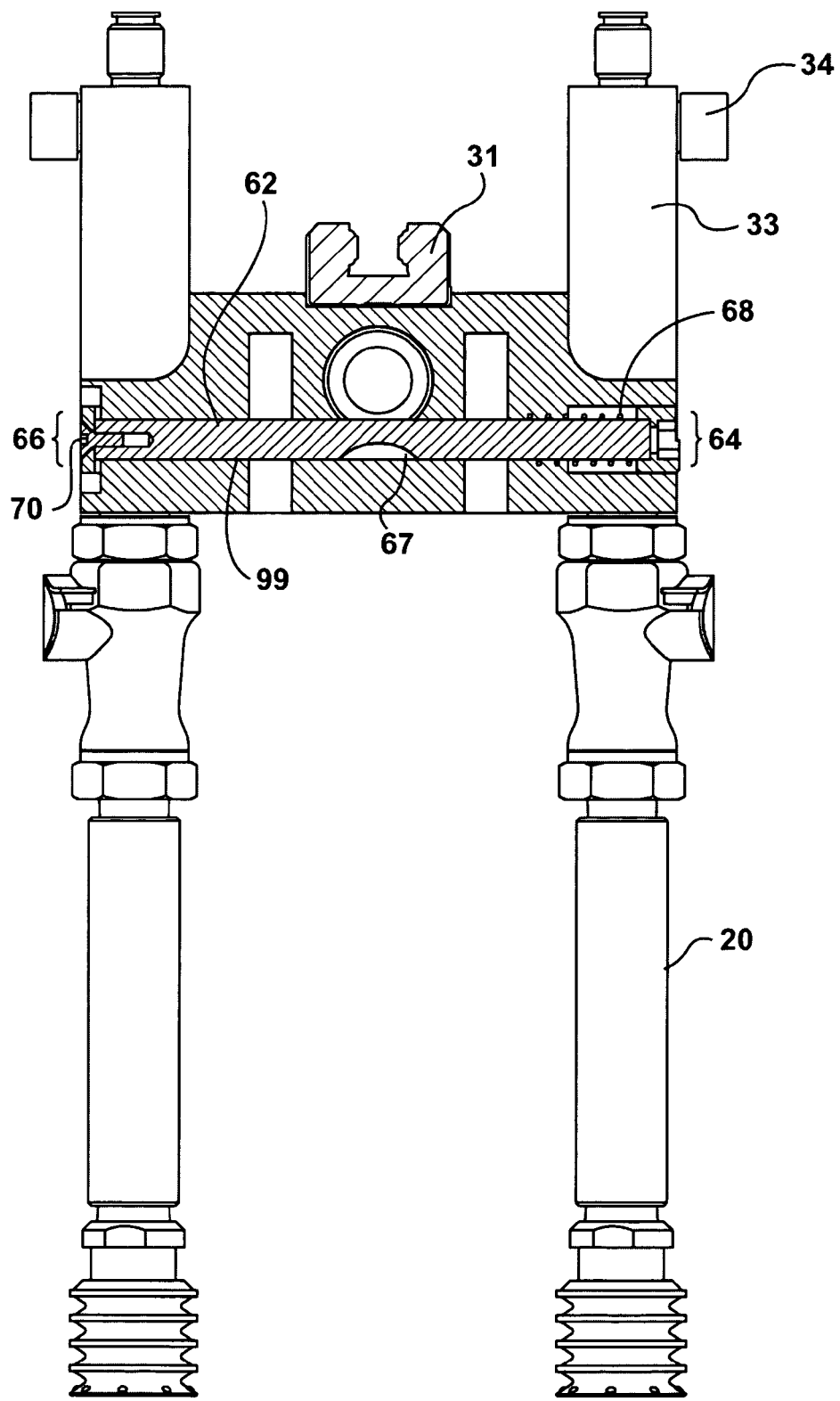
FIG. 7c is cross section view at 7c-7c in FIG. 7b.
Figure 7D:
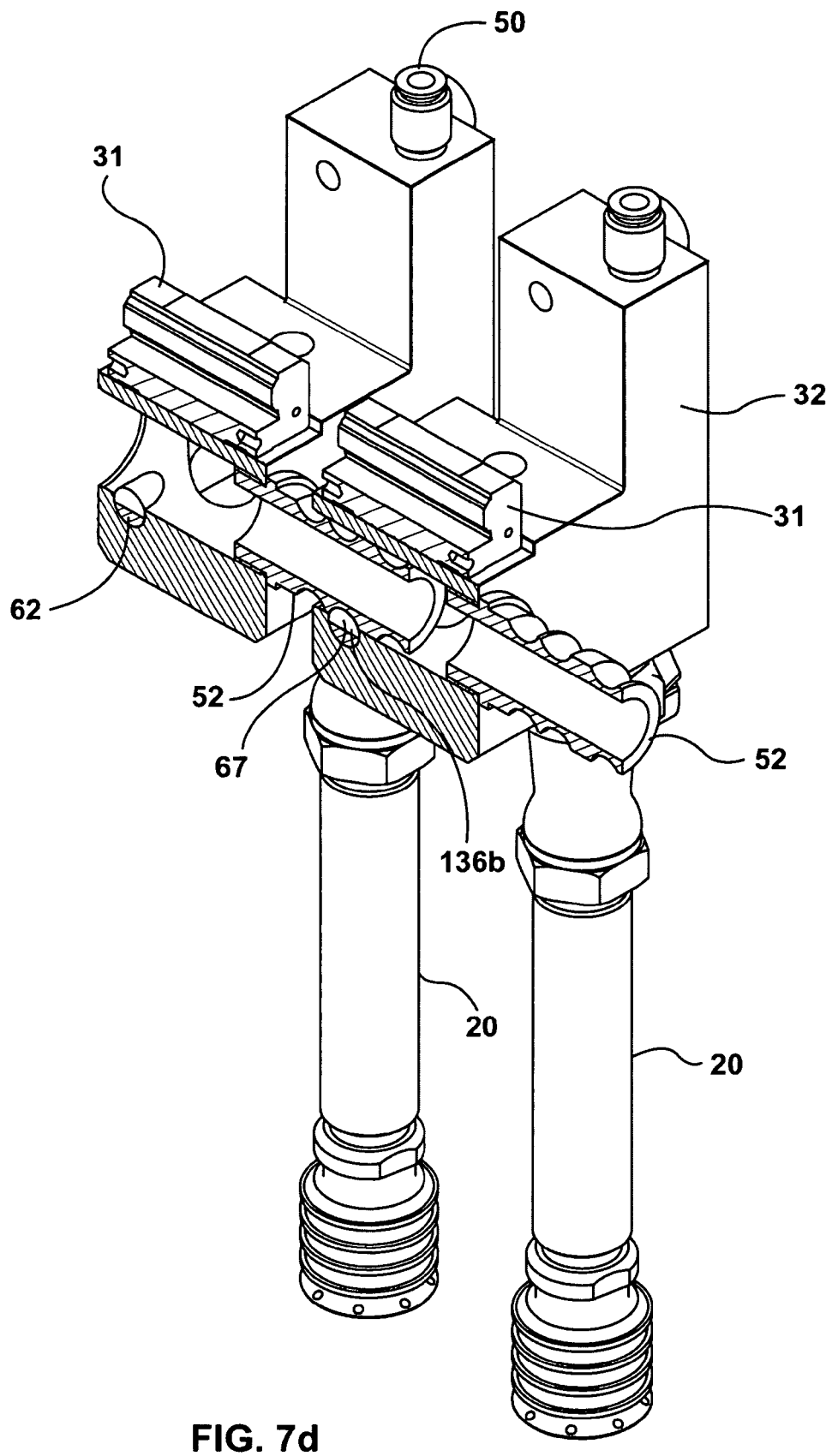
FIG. 7d is a perspective view of the pick up members of FIG. 7, partially broken away.

As shown in FIGS. 5, 6, 7, 7a-d and 8, a locking pin 62 may be situated below, and may be orthogonal to, bore 56. Locking pin 62 may extend in a channel 99 beginning at one end 66 of mounting block 32, extending through mounting block 32 and terminating at the opposite end 64 of mounting block 32. A spring 68 may be provided to encircle the end portion 69 of locking pin 62. Shaft 63 of locking pin 62 may be substantially cylindrical except for a notch 67 in shaft 63 at approximately the midpoint. Otherwise, the shape of shaft 63 may be such that it may engage a groove 136a, 136b or 136c on bushing 52. In the locked position as shown in FIG. 7c, shaft 63 may engage a groove 136 on bushing 52. In the unlocked position (FIG. 7a, 7d), shaft 63 may be rotated 180° so that notch 67 may face toward bushing 52 but because of the shape of notch 67, does not engage a groove 136 on bushing 52. In particular, in FIG. 7d, locking pin 67 may not engage groove 136b and therefore bushing 52 may not link and hold the two pick up members 20 together at a fixed pick up member pitch.

Moreover, the square or rectangular shaft head 70 which is screwed into shaft 63, can be held in a recess 75 formed at end 66 of channel 99 in body 32. Recess 75 may have parallel side edges at end 66 and thus may secure locking pin 62 in place in one of two positions so that it does not freely rotate. Additionally, at end 64 of locking pin 62, may be a head with a hexagonal indentation for receiving a tool (e.g. an Allen key). Any other suitable head and tool may be used as well. Spring 68 biases locking pin 62 towards end 64. To move locking pin 62 from an unlocked position into a locked position, locking pin 62 at end 64 may be pushed against the bias of spring 68 and turned 180° (using for example, an Allen key) so that shaft 63 may engage a groove 136 on bushing 52. The rotation may be possible because head of screw 70 can be pushed out of recess 75. By pushing inwards at end 64 of shaft 63, head 70 may be displaced from recess 75 and thus be able to freely rotate between the two positions that are 180° displaced from each other. Thus locking pin 62 can be set either in a locked or unlocked position. (If a solid rectangular bushing is used instead of a cylindrical bushing, locking pin 62 may be a retractable pin which is received in a hole in the bushing in the locked position and retracted from the hole in the unlocked position.)

In the present embodiment, bushing 52 has three grooves, each groove corresponding to 55 mm, 65 mm and 80 mm pitches (meaning that two adjacent pick up members may be separated by 55 mm, 65 mm or 80 mm). Thus, to attain a separation of 55 mm, locking pin 62 would engage groove 136a, to attain a separation of 65 mm, locking pin 62 would engage groove 136b, and to attain a separation of 80 mm, locking pin 62 would engage groove 136c. However, it may be appreciated that bushing 52 may have more or fewer grooves corresponding to other pitches. Alternatively, other adjustable connection mechanisms between adjacent pick up units in a group may be employed.

Turning now in more detail to pick up members 20, each pick up member 20 may have a connection member 40 by which it may be connected to mounting block 32. Specifically, connection member 40 may have a clip 41 (FIG. 3b, 3c) which is frictionally fitted around a connection member 42 of mounting block 32. Pick up member 20 may be detached from mounting block 32 by actuation of button 135, which may cause clip 41 to be released thus loosening the fit of connection member 42 around connection member 40, and the application of a force (for example, by hand) along the longitudinal axis of pick up member 20 (i.e. in the direction indicated by line F, FIG. 3c). Each pick up member 20 may in this manner be separated from mounting block 32. Thus, a pick up member may easily be detached so as, for example, to suit a particular configuration of items, without disconnecting mounting block 32 from support member 14. Pick up members 20 may each be conventional straight plastic hollow tubes with a quick disconnect coupling such as those manufactured by Colder Products Co. under model number HFC2416 and such as or similar to those described in U.S. Pat. No. 5,316,041 and U.S. Pat. No. 5,494,074, the contents of which are incorporated herein by reference.

Returning to the overall configuration of pick up units 21, groups 120a-e of pick up member units 21 (FIGS. 1 and 2), may be formed with four adjacent pick up member units connected together via respective bushings 52. To further explain, to form group 120a, pick up member unit 21a-1 may be connected via its bushing 52 to pick up member unit 21a-2; pick up member unit 21a-2 may be connected via its bushing 52 to pick up member unit 21a-3; and pick up member unit 21a-3 may be connected to pick up member unit 21a-4 via its bushing 52. However, bushing 52 of pick up member unit 21a-4 may be not connected to its adjacent pick up member unit, 21b-1. In order for the pick up members in group 120a to move together, locking pins 62 of pick up member units 21a-2 and 21a3 and 21a4, should be in the locked position. Moreover, a cam follower 34 of pick up member unit 21a-4 may be received in slot 80 of cam block 24a. It may be appreciated that for each pick up member units 21a-1, 21a-2, 21a-3 and 21a-4, there may be another cam follower located on the other arm of each mounting block.

Referring now to pick up member group 120b, pick up members units 21b-1 to 20b-4 may be connected in a similar manner to group 120a. However, the cam follower of pick up member unit 20b-1 may be connected to slot 81 of cam block 24a and a cam follower of pick up member unit 20b-4 may be connected to a slot of cam block 24b. Pick up member units in groups 120c and 120d may be connected together in likewise manner with the exception of pick up member unit 20c-3, which is additionally pinned to support member 14. Since pick up member unit 20c-3 may be pinned to support member 14, none of the pick up member units in group 20c, to which pick up member unit 20c-3 is connected, may slide along support member 14. In other words, the pick up members in group 120c may remain stationary.

In operation, system 100 may move the robot 118 and device 10 to pick up items 11 from conveyor 116 and deposit them in cartons 114. The vacuum at suction cups 30 on each pick up member 20 can be controlled by controller 220 which may control the flow of pressurized air to the vacuum cartridges 38 associated with each pick up member 20. Thus items can be picked up and released by each pick up member.

The pitch of the groups 120a-e of pick up members 21, can be adjusted by the control of actuator mechanisms 26a, 26b with controller 220 (FIG. 11). Movement of actuator mechanisms 26a and 26b move cam rail 22 toward and away from pick up unit support member 14 which as a result of the cam followers moving in the cam slots 80, 81, can cause one of more cam blocks 24 to slide longitudinally along cam rail 22, and the pick up units 21 to slide longitudinally along support member 14. This can cause the groups of pick up members 120a-e to adjust their relative positions.

Pick up member groups 120a-e may be moved from a converged configuration (FIG. 4) to a diverged grouped configuration (FIG. 2) in the following manner. In the converged configuration, cam followers 34 may be positioned at the bottom of each slot in each cam block 24 for each pick up member unit 21. In a diverged grouped position, cam followers 34 may be positioned at the top of each slot in cam block 24. Synchronised movement of actuator mechanisms 26a and 26b may cause pick up member groups 120a-e to alternate between a converged and diverged position by moving cam rail 22 towards and away from support member 14. As cam rail 22 moves relative to support member 14, the side of each slot of each cam block may bear on the cam follower that is received in the slot. Consequently, the mounting block to which the cam follower is attached can be caused to move longitudinally along support rail 14 (with the exception of the mounting block of pick up member 20c-3 which may be pinned relative to support rail 14). In each group 120a-e, the other pick up members units 21 attached (via bushing 52) to the pick up member unit that may be connected to a cam block are also caused to move. Thus while the pick up member spacing X1 and X2 in each group will not change, the group spacing Y1 will be greater than the group spacing Y2.

As discussed above, previously, a single long cam plate may have been needed to move a pick up member a long distance. Thus, the length of the cam plate was dictated by the length of the greatest longitudinal distance a pick up member had to travel. Specifically, if it was desired to spread a line of pick up members from a converged configuration to a diverged grouped configuration, the first and last pick up member in the line would require the longest cam slot since they have the greatest distance to travel between their initial and final positions. The manner in which the present invention uses multiple cam plates arranged in series to eliminate the need for a long cam plate is explained with reference to FIGS. 12a and 12b.

Figure 12A:
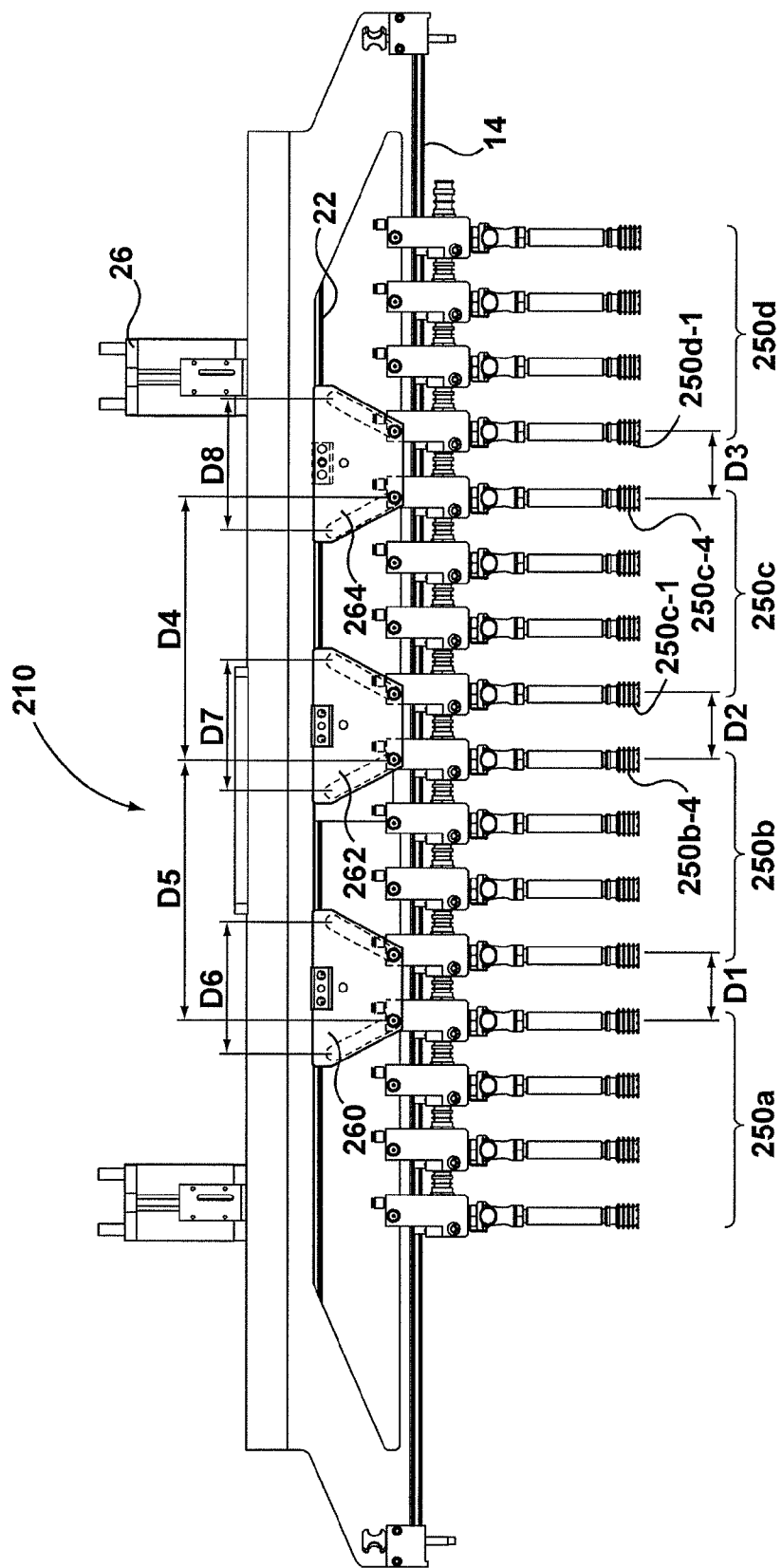
FIG. 12a is a front elevation view of an end effector with four pick up member groups in a converged position.
Figure 12B:
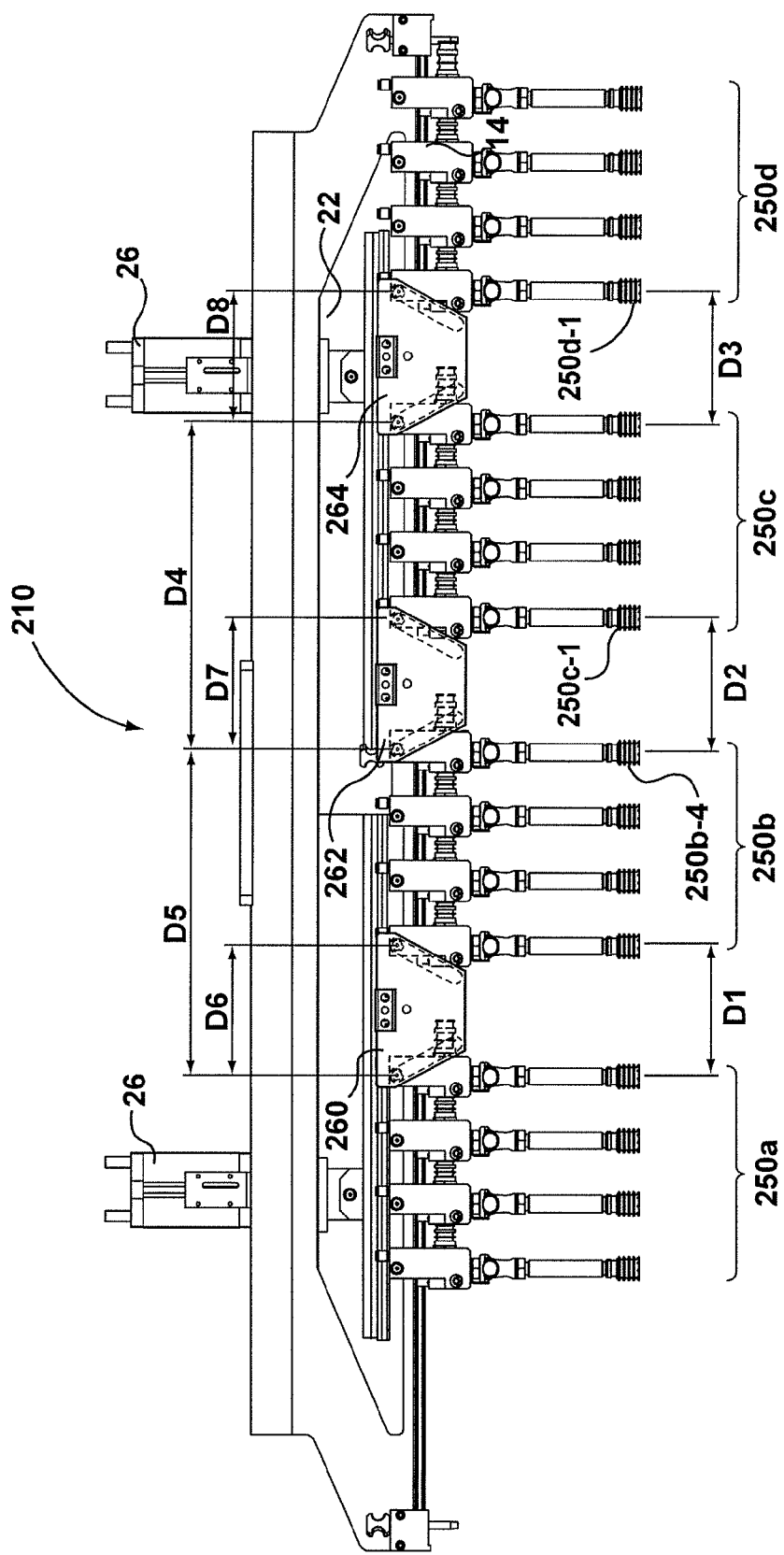
FIG. 12b is a front elevation view of the end effector of FIG. 12a with the four pick up member groups in a diverged position.

FIGS. 12a and 12b show an end effector 210 that is constructed substantially like end effector 10 described above and illustrated in FIGS. 1 to 11. However as shown in FIGS.

12a and 12b, end effector 210 may have four groups of pick up member units, 250a, 250b, 250c and 250d, and three cam blocks, 260, 262, and 264. Each of the pick up units in each group may be separated at the same pick up member pitch S. which does not change during movement of the groups 250a, 250b. Any of the pick up members in any group, such as pick up member unit 250b-4 may be pinned to support member 14. In such an arrangement, group 250b may remain stationary when cam rail 22 is actuated by actuators 26.

Groups 250a and 250b may be separated by distance D1 in the converged configuration (D6 in the diverged configuration); groups 250b and group 250c may be separated by distance D2 in the converged configurations (D7 in the diverged configuration); and groups 250c and 250d may be separated by distance D3 in the converged configuration (D8 in the diverged configuration). If, as illustrated cam blocks 260, 262 and 264 have identical slot configurations, D1=D2=D3 and D6=D7=D8.

When actuators 26 move cam rail 22 downwards, pick up member 250c-1 is separated from pick up member 250b-4 by distance D7. Pick up member 250d-1 is separated from pick up member 250c-4 by distance D8. However, pick up member 250d-1 and pinned pick up member 250b-4 are separated by total distance D7+D8. This is the result of cam blocks 262 and 264 acting in series. It will be appreciated, that in a device having a single cam plate, a cam slot having of longitudinal component of D7+D8 would be needed to separate pick up members 250b-4 and 250d-1 the same distance as the end effector in FIGS. 12a and 12b. Thus, given the angle constraints of the slot to prevent locking of the cam followers in the slots, the overall depth required of the plate would also be significantly increased. In the end effector 250, the required longitudinal distance of travel of a cam follower, while moving in a slot, is divided between cam blocks 262 and 264. It may be appreciated that if a fifth group of pick up members, 250e (not shown) is added to the right of group 250d and groups 250d and 250e are separated by cam block 266 (not shown), then pick up member 250e-1 may be separated from pinned pick up member 250b-4 by a total distance of D7+D8+D9 where D7=D8=D9 if cam block 266 is identical to cam blocks 260, 262 and 264.

Other embodiments of the present invention are possible and will be apparent to those skilled in the art. By way of example only, fewer or more groups of pick up members may be formed by adding or taking away cam blocks. In the embodiment shown in FIGS. 1 and 2, five cam running blocks are provided. However, one, two, three, four or five cam blocks 24 may be attached depending upon the desired grouping configuration. That is, there is no requirement that each cam running block have a cam block attached to it. Moreover, it may be appreciated that fewer or more cam running blocks may be mounted to cam rail 22.

Moreover, the group spacing distances Y1 and Y2 (FIGS. 2 and 4) can be changed when configuring the packaging machine in a different set up. This can be achieved by varying the angle of the slots in cam block 24 (e.g. by interchanging cam blocks). Furthermore, the pitch between adjacent connected pick up members may be changed by changing the groove on bushing 52 to which locking pin 62 is engaged. Alternatively, mounting blocks 32 may be fitted with bushings that provide item pitches other than 55 mm, 65 mm or 80 mm.

In another aspect of the invention, one or more mounting blocks, with or without attached pick up members, may be parked at the side of support member 14 so that they do not interfere with the operation of the end effector. Specifically, the end-most mounting block on each end of support member 14 may be locked by pin 54. However, more than one mounting block may be parked on each side of support member 14 by attaching (using bushing 52) an adjacent mounting block to the pinned mounting block.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

It will be further understood that the invention is not limited to the embodiments described and shown herein, which are deemed to be merely illustrative of the best modes of carrying out the invention, and which are susceptible to modification or form, size, arrangement of parts and details of operation. The invention, rather, is intended to encompass all such modifications which are within its spirit and scope as defined by the claims.

We claim:

1. An apparatus for engaging and releasing a plurality of items comprising:
   (a) a frame having a longitudinally extending support member;
   (b) at least one group of engagement units, each engagement unit having at least one engagement member, said at least one group of engagement units comprising a plurality of engagement units, each of said engagement units in said at least one group operable for engaging with, and disengaging from at least one item, each of said engagement units in said at least one group being mounted in series for longitudinal movement on said longitudinal support member, each one of said plurality of engagement units being interconnected to at least one other of said plurality of engagement units;
   (c) a movement apparatus operable for engaging at least one but not all of said plurality of engagement units in said at least one group to displace said at least one group with longitudinal movement on said longitudinally extending support member; said movement apparatus comprising a cam device disposed between said at least one engagement unit and said frame, said cam device operable to engage a cam element disposed on said at least one engagement unit.

2. An apparatus as claimed in claim 1 wherein said at least one group of engagement units is a group of pick up units and wherein said at least one engagement member is a pick up member.

3. An apparatus as claimed in claim 2 wherein said movement apparatus is operable to engage just one of said plurality of pick up units in said group to displace all said pick up members in said group longitudinally on said longitudinal support member.

4. An apparatus as claimed in claim 3 wherein said movement apparatus is mounted on said frame.

5. An apparatus as claimed in claim 2 wherein said cam device comprises a cam member operable for engaging a cam follower on said one of said plurality of pick up units.

6. An apparatus as claimed in claim 5 wherein said longitudinally extending support member comprises a rail.

7. An apparatus as claimed in claim 5 wherein each of said plurality of pick up units in said group of pick up units has a cam follower, such that said apparatus can be configured such that said cam member is operable to be able to selectively engage any one of said plurality of pick up members.

8. An apparatus as claimed in claim 5 wherein said cam member comprises a cam block having a cam slot operable for engaging said cam follower and wherein each of said pick up units is configured for longitudinal sliding movement.

9. An apparatus as claimed in claim 8 wherein each of said pick up units is configured for longitudinal sliding movement and wherein said cam block is configured for longitudinal movement.

10. An apparatus as claimed in claim 2 wherein each of said pick up units is mounted on said support member for longitudinal sliding movement.

11. An apparatus as claimed in claim 10 wherein said pick up unit comprises first and second pick up members arranged transversely to each other.

12. An apparatus as claimed in claim 2 wherein said at least one group of pick up units comprises first and second groups of pick up units and wherein said movement apparatus is operable to engage only one of said plurality of pick up units in each of said first and second groups of pick up units to displace each of said first and second groups longitudinally on said support member.

13. An apparatus as claimed in claim 12 wherein the spacing distance between said first and second groups can be varied when said movement apparatus engages one of said plurality of pick up units in each of said first and second groups of pick up units.

14. An apparatus as claimed in claim 12 wherein said movement apparatus comprises first and second cam devices each operable for engaging a cam element on one of said plurality of pick up units in each of first and second groups of pick up units respectively, to displace both of said first and second groups of pick up units longitudinally on said support member.

15. An apparatus as claimed in claim 14 wherein each of said plurality of pick up units in said group of pick up units has a cam element comprising a cam follower, such that said apparatus is operable to be configured such that said first cam device can selectively engage any one of said plurality of pick up members.

16. An apparatus as claimed in claim 14 wherein each of said first and second cam devices comprises a cam member operable for engaging a cam follower on said one of said plurality of pick up units in each of said first and second groups respectively.

17. An apparatus as claimed in claim 16, wherein said first and second cam devices each comprises a cam slot in a common cam block.

18. An apparatus as claimed in claim 17 wherein said cam block is configured for sliding longitudinal movement.

19. An apparatus as claimed in claim 18 wherein said first and second cam devices further comprise a cam rail for supporting each cam block, said cam rail being configured and operable to be moved towards and away from said support member.

20. An apparatus as claimed in claim 14 wherein said first and second cam devices are configured for longitudinal movement when in operation engaging one of said plurality of pick up units in each of said first and second groups respectively during longitudinal displacement.

21. An apparatus as claimed in claim 14 wherein said first and second cam devices comprise at least one cam block having first and second cam slots operable for engaging one of said plurality of pick up units in each of said first and second groups respectively, said cam block being configured for longitudinal movement.

22. An apparatus as claimed in claim 21 wherein said at least one cam block is configured for longitudinal movement.

23. An apparatus as claimed in claim 22 further comprising a cam rail for supporting said at least one cam block, said cam rail being configured and operable to be moved towards and away from said support member.

24. An apparatus as claimed in claim 14 wherein each of said pick up units is mounted on said support member and operable for sliding longitudinal sliding movement and said first and second cam devices are located on a cam support operable for sliding longitudinal movement on said cam support.

25. An apparatus as claimed in claim 2 wherein said at least one group of pick up units comprises first, second, third and fourth groups of pick up units and wherein said movement apparatus is operable for engaging only one of said plurality of pick up units in each of said first, second, third and fourth groups of pick up units to displace at least three of said first, second, third and fourth groups of pick up units longitudinally on said support member.

26. An apparatus as claimed in claim 25 wherein said movement apparatus comprises first, second, third, fourth, fifth and sixth cam devices disposed in opposed longitudinally spaced pairs of cam devices, and each of said opposed pairs of cam devices is operable for engaging one of said plurality of pick up units in said first, second, third and fourth groups respectively, to displace at least three of said first, second, third and fourth groups of pick up units longitudinally on said support member.

27. An apparatus as claimed in claim 26 wherein each of said first, second, third, fourth, fifth and sixth cam devices comprises first, second, third, fourth, fifth, and sixth cam members, each of said first, second, third, fourth, fifth and sixth cam members is operable for engaging a cam follower on a respective said one of said plurality of pick up units.

28. An apparatus as claimed in claim 27 wherein said first and second cam members are generally disposed between said first and second groups of pick up units, and wherein said third and fourth cam members are generally disposed between said second and third groups of pick up units.

29. An apparatus as claimed in claim 28 wherein said fifth and sixth cam members are generally disposed between said third and fourth groups of pick up units.

30. An apparatus as claimed in claim 28 wherein said first and second cam members each comprises a cam slot in a first cam block mounted on a cam support rail and said first cam block being operable for longitudinal movement on said cam support rail.

31. An apparatus as claimed in claim 30 wherein said third and fourth cam members each comprises a cam slot in a second cam block mounted on said cam support rail, said second cam block being operable for longitudinal movement on said cam support rail.

32. An apparatus as claimed in claim 2 wherein a first pick up unit in said at least one group is interconnected to a second pick up unit in said at least one group with a releasable connection mechanism.

33. An apparatus as claimed in claim 32 wherein said releasable connection mechanism is operable to position said first pick up unit and said second pick up unit at one of a plurality of settings, each providing a different spatial distance between pick up member in respective first and second pick up units.

34. An apparatus as claimed in claim 33 wherein said releasable connection comprises a protrusion member extending longitudinally from a first pick up unit, said protrusion member is receivable in a channel in said second pick up unit, and further comprising a lock device operable to releasably lock said protrusion member at one of a plurality of selected longitudinal position in said pick up unit.

35. A combination of an industrial robot and an apparatus as claimed in claim 1 wherein said apparatus is configured as an end effector for said industrial robot.

36. An apparatus as claimed in claim 1 wherein said plurality of engagement members in said at least one group are spaced from each other at at least one engagement member pitch, and wherein said apparatus is configured such that in operation, when said movement apparatus engages said at least one but not all of said plurality of engagement units in said at least one group to displace said at least one group longitudinally on said longitudinal support member, the at least one engagement member pitch does not change.

37. An apparatus as claimed in claim 1 wherein each of said engagement units is mounted on said support member and operable for sliding longitudinal sliding movement and said cam device is located on a cam support and is operable for sliding longitudinal movement on said cam support.

38. An apparatus for engaging and releasing a plurality of items comprising:
(i) a longitudinally extending frame;
(ii) at least one group of pick up units, each pick up unit having at least one engagement member, each operable for engaging with, and disengaging from, at least one item, each of said pick up units in said at least one group being mounted in series for longitudinal sliding movement on said frame, each one of said plurality of pick up units being interconnected to at least one other of said plurality of pick up units;
(iii) a movement apparatus operable for engaging at least one but not all of said plurality of pick up units in said at least one group to displace said at least one group with sliding longitudinal movement on said frame;
wherein said at least one group of pick up units comprises first, second and third groups of pick up units and wherein said movement apparatus is operable to engage only one of said plurality of pick up units in each of said first, second and third groups of pick up units to displace at least two of said first, second and third and groups of pick up units longitudinally on said frame and wherein said movement apparatus comprises first, second, third and fourth pushing devices disposed in opposed longitudinally spaced pairs of pushing devices, and each of said opposed pairs of pushing devices configured for engaging one of said plurality of pick up units in said first, second and third groups respectively, to displace at least two of said first, second and third and groups of pick up units longitudinally on said support member.

39. An apparatus as claimed in claim 38 wherein said movement apparatus comprises first, second, third and fourth cam devices disposed in opposed longitudinally spaced pairs of cam devices, and each of said opposed pairs of cam devices configured for engaging a cam element on one of said plurality of pick up units in said first, second and third groups respectively, to displace at least two of said first, second and third groups of pick up units longitudinally on said frame.

40. An apparatus as claimed in claim 39 wherein each of said first, second, third and fourth cam devices comprises first, second, third and fourth cam members, each of said first, second, third and fourth cam members for engaging a cam follower on said one of said plurality of pick up units in said first, second and third groups, respectively.

41. An apparatus as claimed in claim 40 wherein said first and second cam members are generally disposed between said first and second groups of pick up units, and wherein said third and fourth cam members are generally disposed between said second and third groups of pick up units, and said first cam member engages a cam follower on a pick up unit in said first group, and said second and third cam member engages cam followers on one or more pick up units in said second group and said fourth cam member engages a cam follower on a pick up unit in said third group.

42. An apparatus as claimed in claim 41 wherein said first and second cam members each comprises a cam slot in a first cam block mounted on a cam support rail for longitudinal movement.

43. An apparatus as claimed in claim 42 wherein said third and fourth cam members each comprises a cam slot in a second cam block mounted on said cam support rail for longitudinal movement.

44. An apparatus for engaging and releasing a plurality of items comprising:
(a) A longitudinally extending support frame;
(b) at least one group of engagement units, each engagement unit having at least one engagement member, said at least one group comprising a plurality of engagement members, each engagement unit operable for engaging with, and disengaging from, at least one item, each of said engagement units mounted in series for longitudinal movement on said longitudinal support frame, each one of said plurality of engagement units in said group being interconnected to at least one other of said plurality of engagement units in said group;
(c) a movement apparatus operable for engaging at least one of said plurality of engagement units in said group to displace said group longitudinally on said longitudinal support frame;
(d) a releasable connection mechanism comprising a protrusion device extending longitudinally from at least a first engagement unit of said plurality of engagement units, said protrusion device being operable to be received in a channel in a second engagement unit of said plurality of engagement units, and said releasable connection mechanism further comprising a lock device operable to releasably lock said protrusion device of said first engagement unit in said channel of said second engagement unit.

45. An apparatus as claimed in claim 44 wherein each of said at least one group of engagement units is a group of pick up units and wherein said at least one engagement member is a pick up member.

46. An apparatus as claimed in claim 45 wherein said releasable connection mechanism is operable to position a first pick up unit and a second pick up unit at one of a plurality of settings, each providing a different spatial distance between pick up members in respective first and second pick up units.

47. An apparatus as claimed in claim 46 wherein said lock device is operable to releasably lock said protrusion device at one of a plurality of selected longitudinal positions in said pick up unit.

48. An industrial robot comprising an end effector for engaging and releasing a plurality of items, said end effector comprising:
(a) an elongated support;
(b) at least one group of engagement units, each engagement unit having at least one engagement member, said at least one group of engagement units comprising a plurality of engagement units, each one of said plurality of engagement units being operable to engage and disengage from at least one item, each one of said plurality of engagement units in said at least one group being mounted for movement along said support, and each one of said plurality of engagement units being interconnected to at least one other of said plurality of engagement units;

(c) a movement apparatus for engaging at least one but not all of said plurality of engagement units in said at least one group to displace said at least one group along said support frame; said movement apparatus comprising a cam device disposed between said at least one engagement unit and said support, said cam device operable to engage a cam element disposed on said at least one engagement unit.

49. A robot as claimed in claim 48 wherein said at least one group of engagement units is a group of pick up units and wherein said at least one engagement member is a pick up member.

50. A robot as claimed in claim 49 wherein said movement apparatus engages just one of said plurality of pick up units in said group to displace all said pick up members in said group.

51. A robot as claimed in claim 50 wherein said cam device comprises a cam member for engaging a cam follower on said one of said plurality of pick up units and wherein each of said pick up units is mounted on said support for longitudinal sliding movement.

52. A robot as claimed in claim 50 wherein said movement apparatus comprises first and second cam devices each being configured for longitudinal movement when engaging one of said plurality of pick up units in each of said first and second groups respectively, to displace said first and second groups of pick up units longitudinally on said support, and wherein said first and second cam devices comprise at least one cam block having first and second cam slots for engaging a cam follower on one of said plurality of pick up units in each of said first and second groups respectively.

53. A robot as claimed in claim 52 wherein said at least one cam block is configured for longitudinal movement.

54. An apparatus as claimed in claim 53 wherein said first and second cam devices further comprises a cam rail for supporting said at least one cam block, said cam rail being configured and operable to move towards and away from said support.

55. An apparatus comprising:
(i) a longitudinally extending support;
(ii) at least one group of engagement units operable to engage with, and disengage from, at least one item, each of said engagement units in said at least one group being mounted in series for longitudinal movement on said support frame, each one of said plurality of engagement units being interconnected to at least one other of said plurality of engagement units;
(iii) a cam device operable for engaging a cam element on at least one but not all of said plurality of engagement units in said at least one group, said cam device operable for displacing said at least one group of engagement units longitudinally on said frame.

56. An apparatus as claimed in claim 55 wherein said cam element comprises a cam follower and said cam device comprises a cam block with a cam slot for engaging the cam follower, and said apparatus further comprises a cam rail for supporting said cam block, said cam rail being configured and operable to be moved towards and away from said support.

57. An apparatus for engaging and releasing a plurality of items comprising:
a) longitudinally extending support frame;
b) at least one group of engagement units, each engagement unit having at least one engagement member, said at least one group comprising a plurality of engagement units, each engagement unit operable for engaging with, and disengaging from, at least one item, each of said engagement units in said at least one group being mounted in series for longitudinal movement on said support frame, each one of said plurality of engagement units in said at least one group being interconnected to at least one other of said plurality of engagement units in said at least one group;
c) a movement apparatus operable for engaging at least one of said plurality of engagement units in said group to displace said group longitudinally on said support frame;
d) a releasable connection mechanism operable for interconnecting a first engagement unit in said at least one group to a second engagement unit in said group; said releasable connection mechanism comprising a protrusion element extending longitudinally from a first engagement unit of said plurality of engagement units, said protrusion element being operable to be received in a channel in a second engagement unit of said plurality of engagement units, said releasable connection mechanism further comprising a lock device operable to releasably hold said protrusion element of said first engagement unit in said channel of said second engagement unit.

58. An apparatus for engaging and releasing a plurality of items comprising:
a) a longitudinally extending support frame;
b) at least one group of engagement units comprising a plurality of engagement members, each of said plurality of engagement units being operable to engage with, and disengage from, at least one item, each of said plurality of engagement units being mounted in series for longitudinal movement on said longitudinal frame, each one of said plurality of engagement units in said group being interconnected to at least one other of said plurality of engagement units in said group;
c) a movement apparatus operable for moving at least one of said plurality of engagement units in said group to displace said group longitudinally on said longitudinal support frame;
d) a releasable connection mechanism operable for interconnecting a first engagement unit in said at least one group to a second engagement unit in said group, said releasable connection mechanism being operable to position said first unit and a said second engagement unit at one of a plurality of settings, each providing a different spatial distance between engagement members in respective first and second pick up units.

59. An apparatus for engaging and releasing a plurality of items comprising:
(a) a longitudinally extending support;
(b) a plurality of pick up units, each of said pick up units operable to pick up and release at least one item, each of said plurality of pick up units being mounted in series for longitudinal movement on said longitudinally extending support, each one of said plurality of pick up units being interconnected to at least one other of said plurality of pick up units;
(c) a movement apparatus operable for engaging at least one but not all of said plurality of pick up units to displace said plurality of pick up units with longitudinal movement on said longitudinally extending support; said movement apparatus comprising at least one cam device disposed between said at least one pick up unit and said support, said at least one cam device operable to engage a cam element disposed on said at least one pick up unit.

60. An apparatus as claimed in claim 59 wherein each of said plurality of pick up units is configured and operable for sliding longitudinal sliding movement on said support and said at least one cam device is configured and operable for sliding longitudinal movement on a cam support.

61. An apparatus as claimed in claim 60 wherein said plurality of pick up units comprises first and second groups of pick up units and wherein said movement apparatus is operable to engage only one of said plurality of pick up units in at least one of said first and second groups of pick up units to displace said at least one of said first and second groups longitudinally on said support.

62. An apparatus as claimed in claim 61 wherein the spacing distance between said first and second groups of pick up units can be varied when said movement apparatus engages one of said plurality of pick up units in at least one of said first and second groups of pick up units.

63. An apparatus as claimed in claim 62 wherein said movement apparatus comprises first and second cam devices each operable for engaging a cam element on one of said plurality of pick up units in each of first and second groups of pick up units respectively, to displace both of said first and second groups of pick up units longitudinally on said support.

64. An apparatus as claimed in claim 60 wherein said at least one group of pick up units comprises first, second and third groups of pick up units and wherein said movement apparatus is operable for engaging only one of said plurality of pick up units in each of said first, second and third groups of pick up units to displace at least two of said first, second and third groups of pick up units longitudinally on said support.

65. An apparatus as claimed in claim 64 wherein one of said pick up units in one of said first, second and third groups of pick up units comprises a releasable lock mechanism to selectively restrict the sliding movement of said one group of pick up units on said support.

* * * * *

UNITED STATES PATENT AND TRADEMARK OFFICE
CERTIFICATE OF CORRECTION

| | |
|---|---|
| PATENT NO. | : 8,534,727 B2 |
| APPLICATION NO. | : 12/285616 |
| DATED | : September 17, 2013 |
| INVENTOR(S) | : Andre Weclawski et al. |

It is certified that error appears in the above-identified patent and that said Letters Patent is hereby corrected as shown below:

In the Claims:
Column 17
Claim 48, line 7, replace "support frame" with --support--

Signed and Sealed this
Eighteenth Day of February, 2014

Michelle K. Lee
*Deputy Director of the United States Patent and Trademark Office*